(12) United States Patent
Blair et al.

(10) Patent No.: US 6,827,404 B2
(45) Date of Patent: Dec. 7, 2004

(54) FOLD FLAT VEHICLE SEAT COINCIDENT WITH REARWARD TRAVEL

(75) Inventors: David M. Blair, Troy, MI (US); Thomas J. Cooley, Lapeer, MI (US); Dan Dumitru Nae, Troy, MI (US); Wojciech Smuk, Troy, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 10/649,606

(22) Filed: Aug. 28, 2003

(65) Prior Publication Data

US 2004/0075323 A1 Apr. 22, 2004

Related U.S. Application Data

(60) Provisional application No. 60/406,776, filed on Aug. 29, 2002.

(51) Int. Cl.[7] .................................................. B60N 2/36
(52) U.S. Cl. .............................. 297/378.12; 297/378.1; 297/344.11
(58) Field of Search ........................ 297/378.12, 378.14, 297/378.11, 378.1, 344.11, 15

(56) References Cited

U.S. PATENT DOCUMENTS

| | | | | |
|---|---|---|---|---|
| 4,422,690 A | * | 12/1983 | Kopich | 297/378.12 X |
| 4,634,180 A | * | 1/1987 | Zaveri et al. | 297/378.12 X |
| 4,844,542 A | * | 7/1989 | Humer | 297/378.12 X |
| 5,393,123 A | * | 2/1995 | Hernandez et al. | 297/378.12 |
| 5,531,503 A | * | 7/1996 | Hughes | 297/378.1 X |
| 5,597,206 A | * | 1/1997 | Ainsworth et al. | 297/378.12 |
| 6,048,030 A | * | 4/2000 | Kanda et al. | 297/378.1 X |
| 6,231,123 B1 | * | 5/2001 | Tame | 297/378.1 |
| 6,336,679 B1 | * | 1/2002 | Smuk | 297/378.12 |
| 6,371,558 B1 | * | 4/2002 | Couasnon | 297/378.1 |
| 6,767,063 B1 | * | 7/2004 | Abdella et al. | 297/378.12 |

* cited by examiner

*Primary Examiner*—Rodney B. White
(74) *Attorney, Agent, or Firm*—Patrick J. Hofbauer

(57) ABSTRACT

A fold flat vehicle seat comprises a seat assembly mounted on a movable track member slidably engaging a fixed track member, and lockable by a track lock. The seat assembly includes a seatback member mounted on a seat cushion member for forward folding between a substantially upright occupiable design position and a substantially horizontal load supporting position. A downwardly and rearwardly sloped ramp is mounted on the fixed track member. A drive link assembly is mounted on the seatback member for translational engagement of a ramp contact member with the ramp. As the seatback member is forwardly folded from the upright occupiable design position to the load supporting position the track lock releases and the ramp contact member moves downwardly and rearwardly along the ramp to thereby cause rearward longitudinal movement of the seat assembly relative to the fixed track member to a predetermined rear longitudinal position.

22 Claims, 19 Drawing Sheets

FOLD FLAT VEHICLE SEAT COINCIDENT WITH REARWARD TRAVEL

This application claims benefit of 60/406,776 Aug. 29, 2002.

FIELD OF THE INVENTION

The present invention relates to vehicle seats that fold flat to a substantially horizontal load supporting position and more particularly to such vehicle seats that move to such a substantially horizontal load supporting position as the seatback member is being forwardly folded over the seat cushion member.

BACKGROUND OF THE INVENTION

Multi-seat vehicles, such as vans, minivans, sport utility vehicles, and the like, typically have middle (second row) and rear (third row) vehicles seats that are placed rearwardly of the driver's and front passenger's (first row) vehicle seats. The second and third row seats are typically selectively removable and replaceable through a large rear or side door in order to ready the vehicle for carrying cargo. Removal and replacement of these vehicle seats tends to be somewhat difficult and requires a considerable amount of effort on the part of the user, especially with respect to the middle vehicle seat.

To overcome this problem and so as to maximize cargo carrying capabilities, many second and third row seats, and even some first row passenger seats, are configurable from an upright occupiable position to a substantially horizontal load supporting position, whereat the back surface of the seatback acts as a load supporting surface, by means of forwardly folding the seatback member over the seat cushion member.

A significant problem encountered during the forward folding of a seatback member over the seat cushion member is that of interference between the headrest of the seatback member being forwardly folded with a part of the vehicle's interior disposed immediately in front of it. For instance, a front passenger seat headrest might hit the dashboard upon forward folding of its seatback member. A second row seat, or a third row seat, might hit the rear of the seatback member disposed immediately in front of it. Such interference precludes the seatback member from forthwith reaching its fully forwardly folded position, which is unacceptable.

One prior art patent that discloses an apparatus that overcomes the problem of interference between the headrest of the seatback member and a part of the vehicle's interior, as described above, is U.S. Pat. No. 6,371,558, issued Apr. 16th, 2002 to Couasnon, entitled Fold Flat Vehicle Seat, the teachings of which patent are incorporated herein by reference. The Fold Flat Vehicle Seat comprises a seat assembly mounted on a moveable track member that slidably engages a fixed track member. As the seatback member pivots forwardly and downwardly towards its fully forwardly folded position over the seat cushion member, a link arm member connected to the seatback member engages the end of a guide slot in the fixed track member, so as to preclude further forward movement of the link arm member. Continued forward folding of the seatback member to its fully forwardly folded position, causes the link arm member to push the seat assembly rearwardly to a predetermined rear longitudinal position. When the seat assembly is in its predetermined rear longitudinal position, the seatback member can reach its fully forwardly folded position without contacting another part of the vehicle's interior.

While it has been found that the Couasnon Fold Flat Vehicle Seat works quite well, it does have some limitations associated with it. Firstly, the link arm member is quite lengthy, and accordingly is not adaptable to all vehicle seat situations. Further, it tends to intrude into the passenger envelope during forward folding of the seatback member, which is undesirable, from the standpoints of passenger interference and passenger safety (e.g. pinching of fingers, etc.). Also, due to the specific geometric limitations of the link arm member in conjunction with the seatback member, the maximum rearwardly longitudinal travel of the seat assembly that can be induced by the Couasnon link arm member is about one hundred millimetres, which is not sufficient for larger vehicles.

Secondly, depending on the longitudinal position of the seat assembly, there may tend to be a gap between longitudinally adjacent seats that are in the fully forwardly folded position. Such gaps tends to permit objects to fall between longitudinally adjacent seats, or to become caught between them during loading. Such gaps are undesirable, and accordingly should be minimized, or even be made nonexistent.

Thus, it is an object of the present invention to provide a fold flat vehicle seat that is adaptable to various vehicle seat configurations, irrespective of the specific vehicle seat.

It is another object of the present invention to provide a fold flat vehicle seat that does not significantly protrude into the passenger envelope during forward folding of the seatback member.

It is a further object of the present invention to provide a fold flat vehicle seat that does not interfere with passengers during forward folding of the seatback member.

It is another object of the present invention to provide a fold flat vehicle seat that is safe for passengers during forward folding of the seatback member.

It is another object of the present invention to provide a fold flat vehicle seat that is capable of significantly more rearward longitudinal travel than prior art mechanisms of similar functionality, during forward folding of the seatback member to a fully forwardly folded position.

It is yet another object of the present invention to provide a fold flat vehicle seat that has utility in larger vehicles.

It is still another object of the present invention to provide a fold flat vehicle seat that is relatively inexpensive to manufacture, as compared to prior art vehicle seats having similar composite functionality.

SUMMARY OF THE INVENTION

In accordance with one aspect of the present invention there is disclosed a fold flat vehicle seat comprising a movable track member slidably engaging a fixed track member and having a seat assembly mounted thereon for longitudinal sliding movement of the movable track member and the seat assembly relative to the fixed track member along a longitudinal axis. A track lock means is operatively interconnected between the movable and fixed track members and movable between a locked configuration whereat the movable track member is precluded from moving longitudinally relative to the fixed track member and a released configuration whereat the movable track member is permitted to move longitudinally relative to the fixed track member. The seat assembly includes a seat cushion member mounted on the movable track member and a seatback member mounted on the seat cushion member for forward folding about a seatback pivot axis between a substantially upright occupiable design position and a substantially horizontal load supporting position. A seatback member latch means is operatively engaged between the seatback member and the seat cushion member to selectively control the forward folding of the seatback member. A downwardly and rearwardly sloped ramp means is operatively mounted in fixed relation with respect to the fixed track member. A drive link assembly has a ramp contact member and is operatively mounted on the seatback member for translational engagement of the ramp contact member with the ramp means, such that as the seatback member is forwardly folded about the seatback pivot axis from the upright occupiable design position to the substantially horizontal load supporting position the track lock means moves to the released configuration, and the ramp contact member moves downwardly and rearwardly along the ramp means to thereby cause rearward longitudinal movement of the seat assembly relative to the fixed track member to a predetermined rear longitudinal position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the fold flat vehicle seat according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
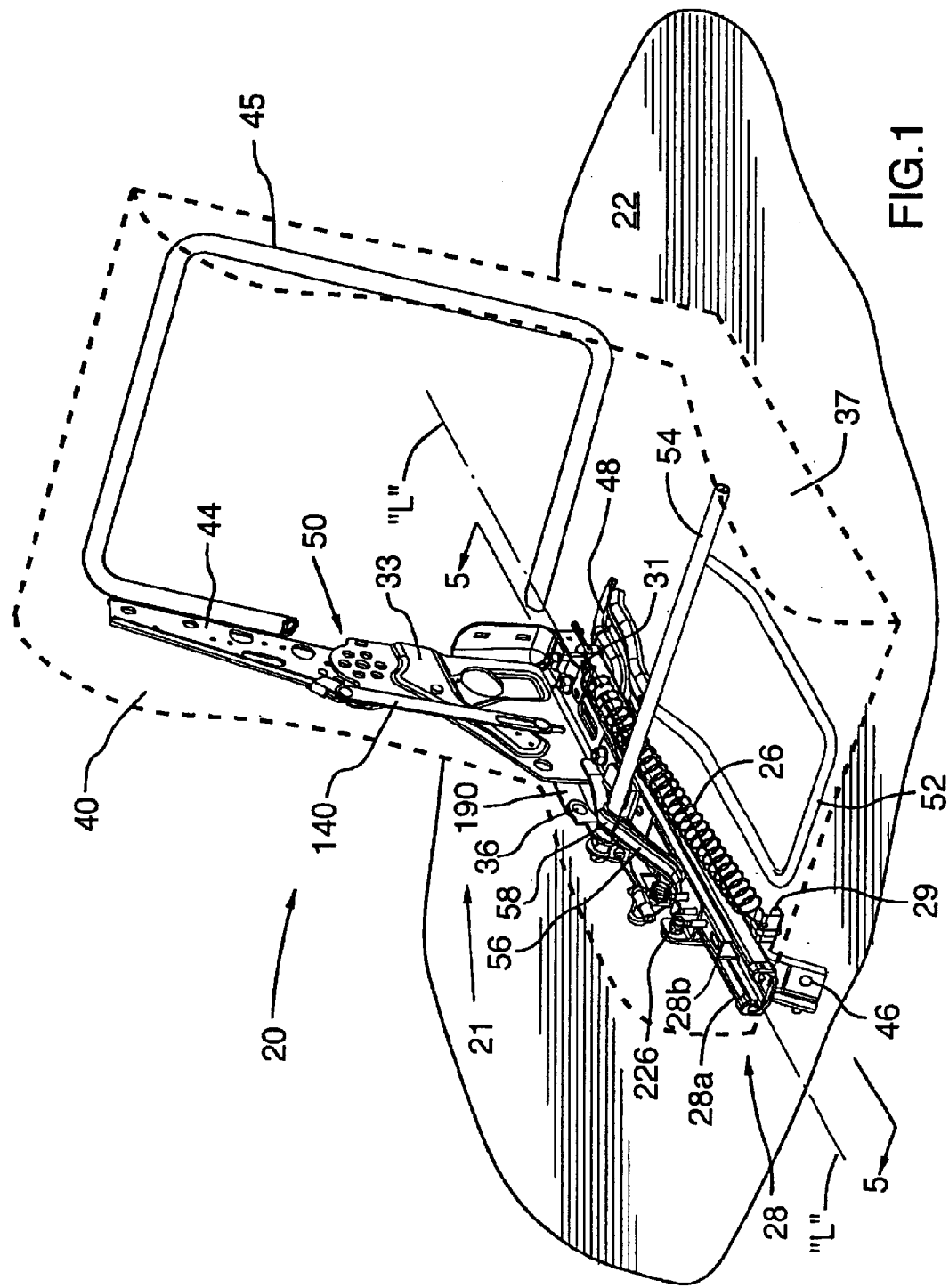
FIG. 1 is a perspective view from the front left of a fold flat vehicle seat according to the present invention, showing the seat cushion member and the seatback member in dashed lining, with the seatback member in a substantially upright occupiable design position.
Figure 2:
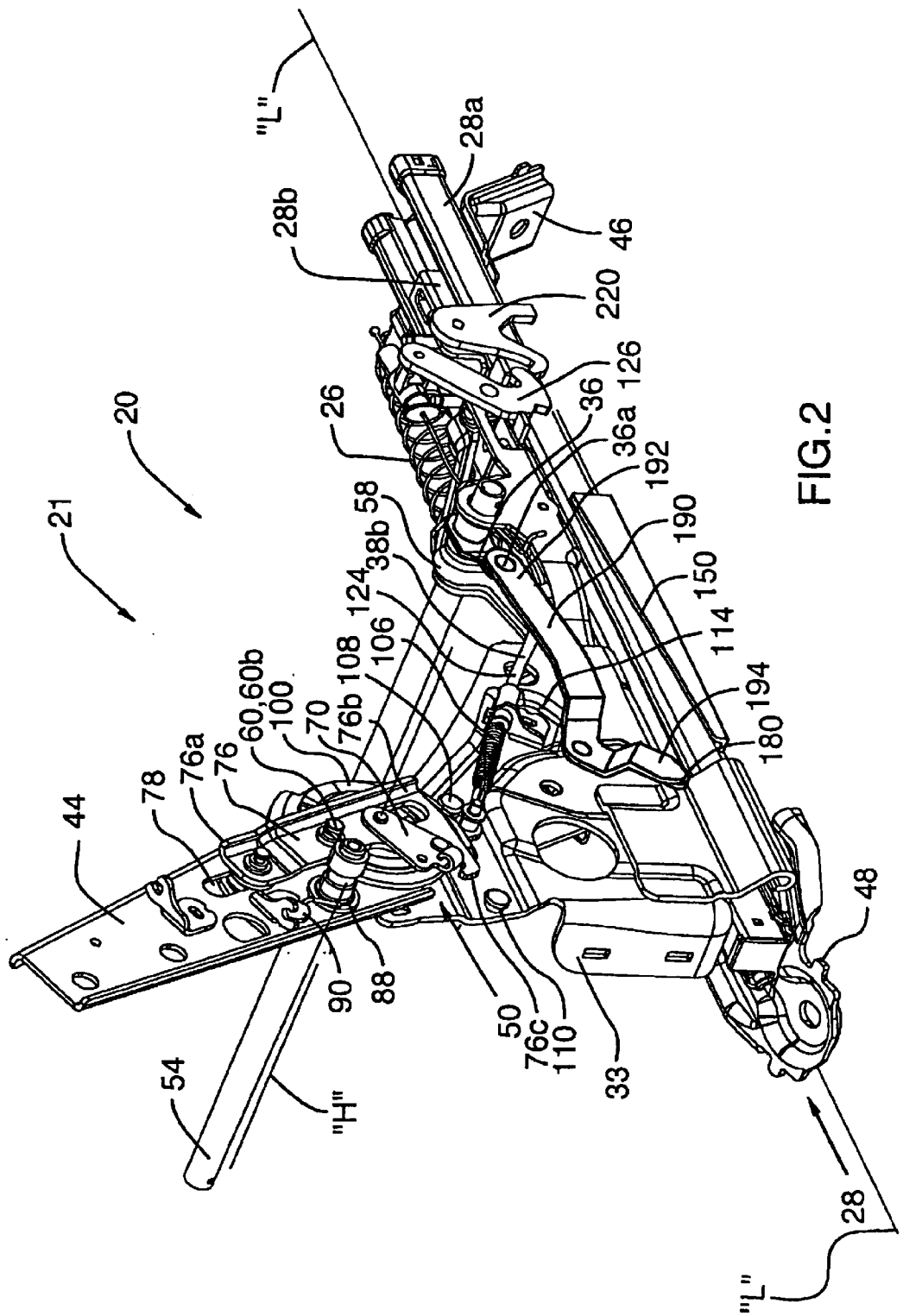
FIG. 2 is a perspective view from the rear right of the right half of the fold flat vehicle seat of FIG. 1.

Reference will now be made to FIGS. 1 through 18, which show a first preferred embodiment of the fold flat vehicle seat of the present invention, as indicated by general reference numeral 20.

Figure 16:
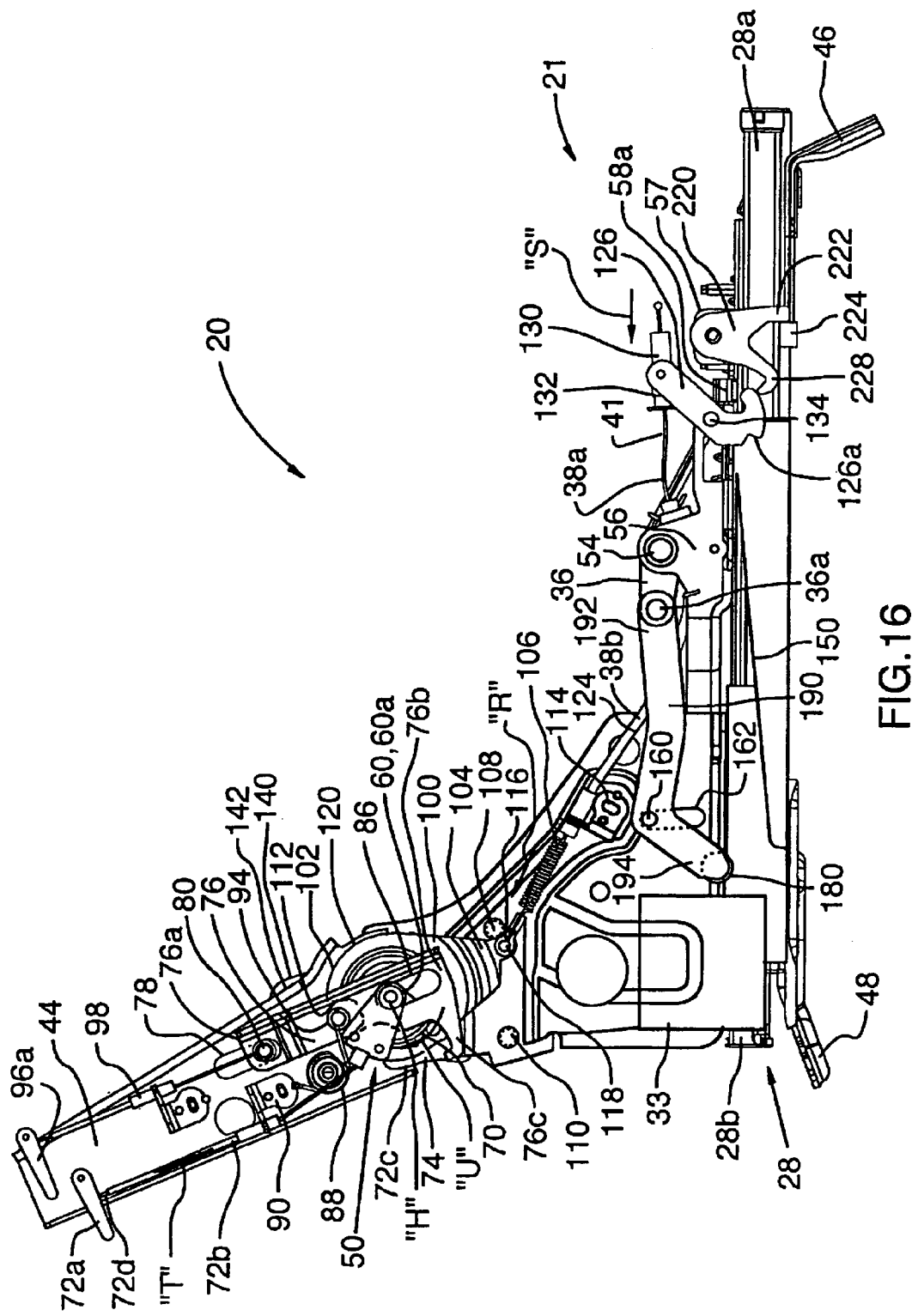
FIG. 16 is a right side elevational view similar to FIG. 3, but with the first (i.e.: rearward) lever handle being lifted in order to release the rotary recliner and to effect the "E-Z entry" feature.
Figure 17:
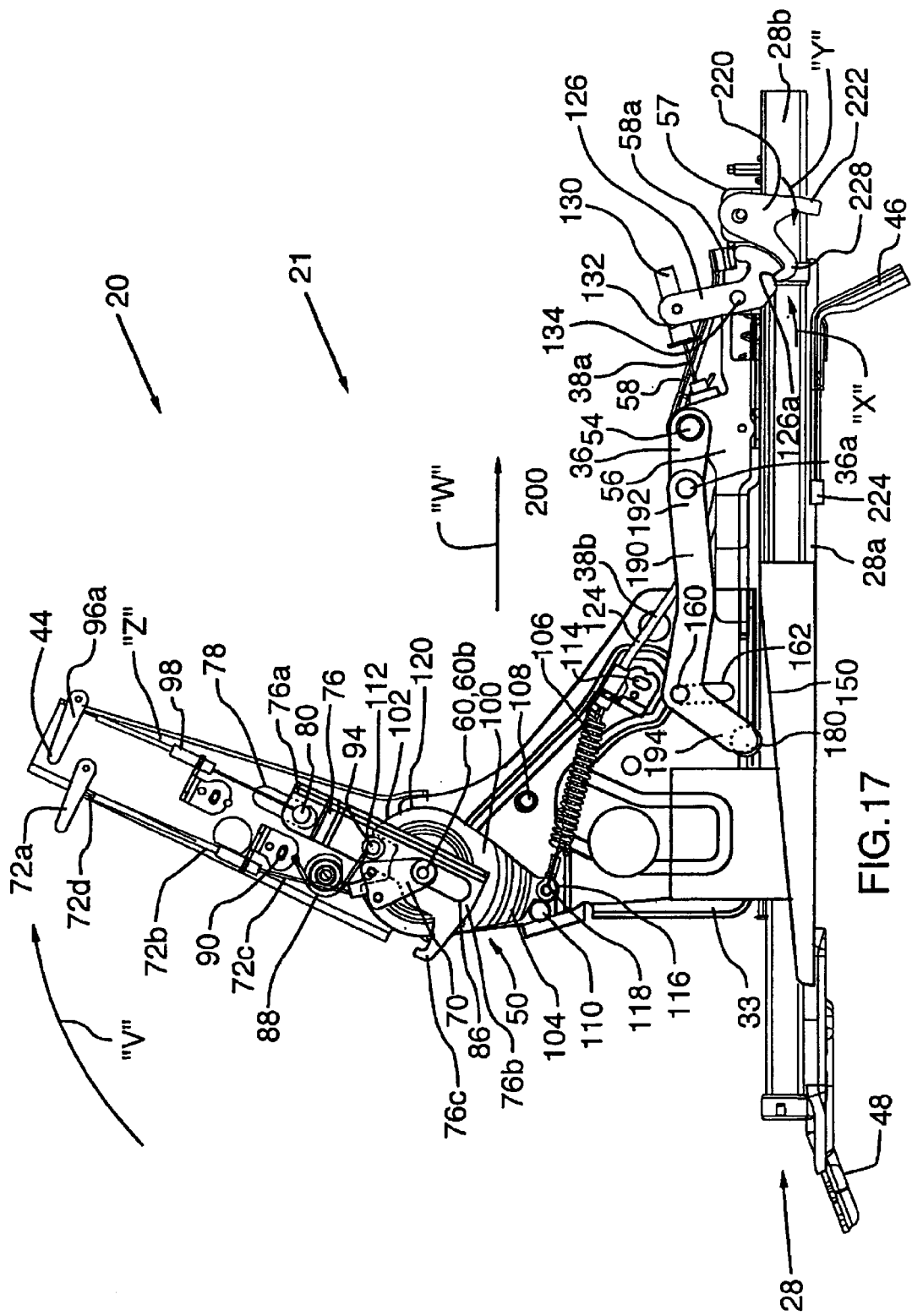
FIG. 17 is a right side elevational view similar to FIG. 16, but with the track lock having been released and the seat assembly in its "E-Z entry" position, forward of the upright design position shown in FIG. 15.
Figure 18:
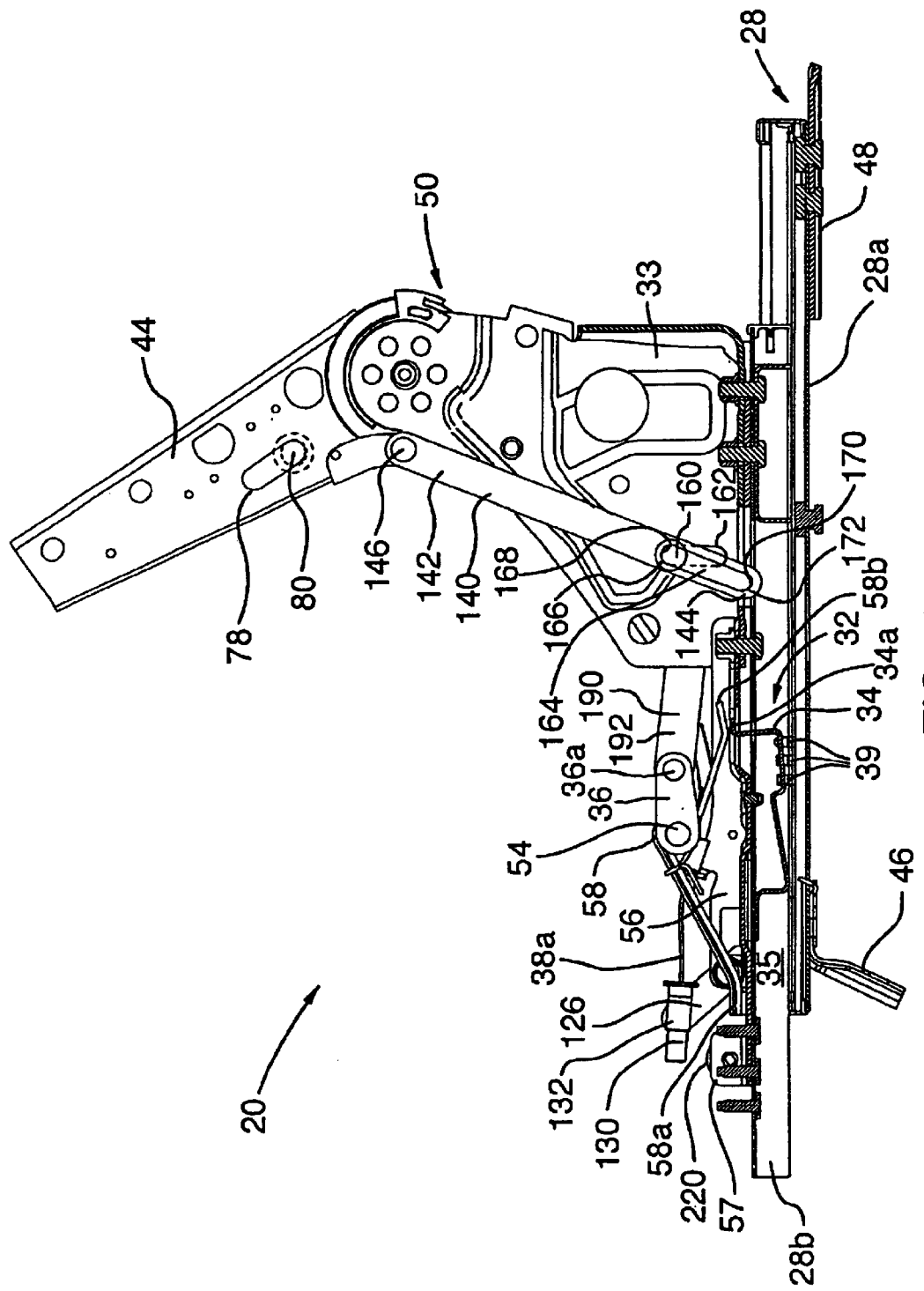
FIG. 18 is a left side elevational view of the seat assembly of FIG. 17 in its "E-Z entry" position; and, FIG. 19 is a right side elevational view similar to FIG. 17, but with the forward (i.e.: second) lever handle having been lifted to release the rotary recliner, to thereby permit movement of the seat assembly to the substantially horizontal load supporting position.

In FIGS. 1 through 18 of the drawings, there is shown a preferred embodiment of fold flat vehicle seat 20 in various positions and configurations. The preferred embodiment of the fold flat vehicle seat 20 has a substantially upright design configuration, as shown in FIGS. 1 through 8 and 15, which is the configuration typically used by an occupant. The preferred embodiment of the seatback member 40 also has a forwardly tilted easy entry position, which is well known in the industry as an "E-Z entry" position, and is shown in FIGS. 16 through 18. The overall track assembly and the "E-Z entry" system are described in more detail in U.S. Pat. No. 6,336,679, issued Jan. 8, 2002, to Smuk, and entitled Rotary Recliner Control Mechanism for Multifunction Vehicle Seat Applications, the teachings of which patent are incorporated herein by reference. The fold flat vehicle seat 20 is installed on a vehicle floor 22 (partially shown in FIG. 1) of a vehicle (not shown). The seat assembly 21 is mounted on right hand track assembly 28 and left hand track assembly (not shown), which track assemblies per se are of a prior art design, as shown in U.S. Pat. No. 6,336,679. The seat track assemblies may be used to adjust the position of the entire seat assembly 21 in the forward (i.e., to the front of the vehicle, and to the left of FIG. 1) and aft (i.e., to the rear of the vehicle, and to the right of FIG. 1) directions. It is note that the directions "forward", "front", "fore", "rearward", "rear", "aft", and so on, and the references "right hand" and "left hand" and the like, are made from the standpoint of an occupant sitting in the fold flat vehicle seat 20.

The right hand track assembly 28 and left hand track assembly (not shown) are, as is well known in the art, similar in structure, and accordingly, for clarity and ease of description, only the right hand side 28 track assembly and its related structures will be specifically referenced hereafter.

The right hand track assembly 28 is secured to the vehicle floor 22 by front floor mounting bracket 46 and rear floor mounting bracket 48. The seat track assembly 28 has a fixed (lower) track member 28a that is affixed to the vehicle floor 22 by means of threaded fasteners (not shown) extending in a conventional manner through the front and rear floor mounting brackets 46, 48.

As part of the track assembly 28, the fold flat vehicle seat 20 also comprises a movable track member 28b slidably engaging the fixed track member 28a for longitudinal sliding movement of the movable track member 28b relative to the fixed track member 28a along a longitudinal axis "L". The movable track member 28b has the seat assembly 21 mounted thereon in a conventional manner for longitudinal sliding movement of the seat assembly 21 relative to the fixed track member along the longitudinal axis "L". In this manner, the seat assembly 21 is adjustable fore and aft to a selected position, also known as a comfort position. As indicated by arrow "A" in FIG. 6, the seat assembly 21 has been moved forwardly from the design position shown in FIG. 5, to the comfort position shown in FIG. 6.

A known track lock means, as indicated by general reference numeral 32, is operatively interconnected between the movable track member 28b and the fixed track member 28a. The track lock means 32 is movable between a locked configuration, as can be best seen in FIGS. 1 through 9 and 16, and a released configuration, as can be best seen in FIGS. 10 through 15 and 17 through 19. In the locked configuration, the movable track member 28b is precluded from moving longitudinally relative to the fixed track member 28a, to thereby fix the seat assembly 21 in a selected longitudinal position. In the released configuration, the movable track member 28b is permitted to move longitudinally relative to the fixed track member 28a.

Figure 7:
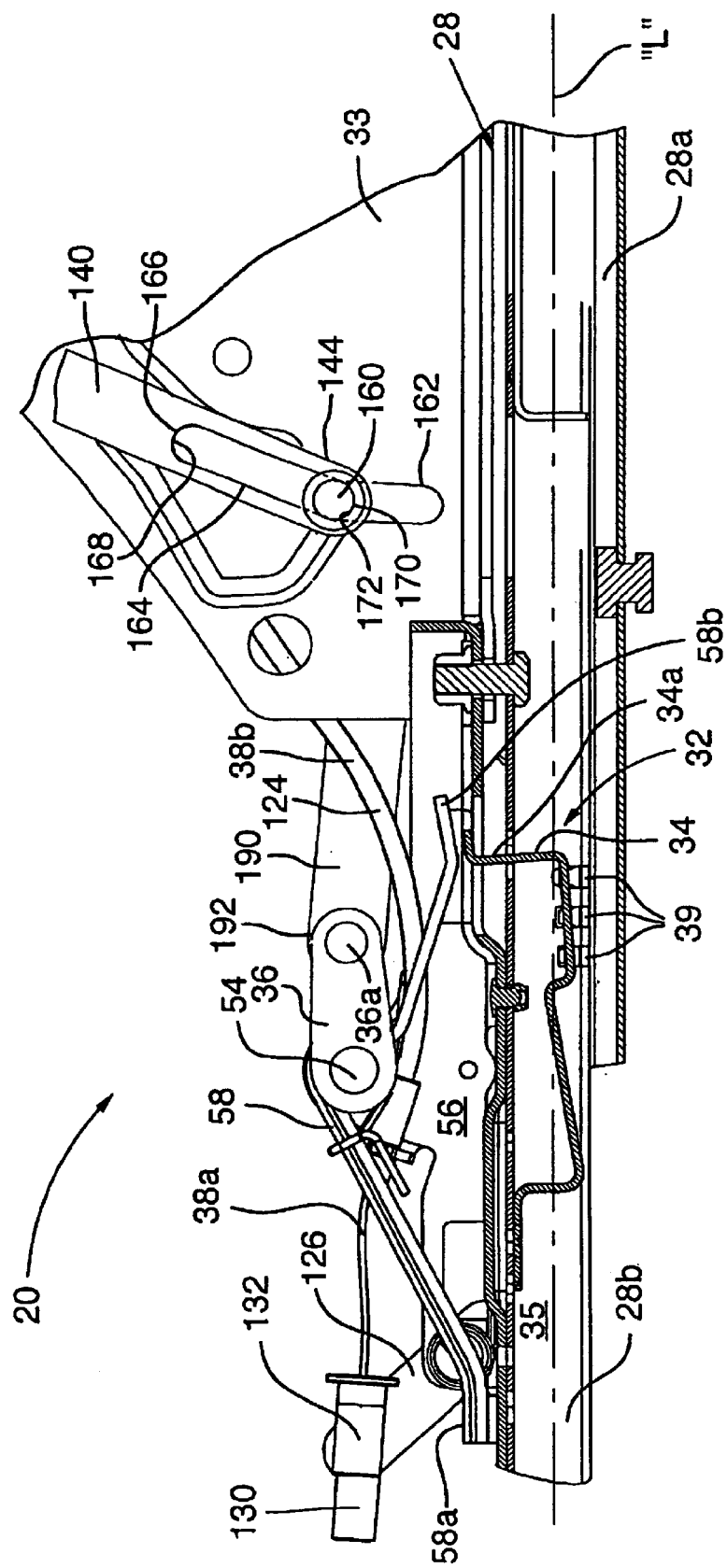
FIG. 7 is an enlarged cross-sectional side elevational view of a portion of the track lock means of the fold flat vehicle seat in the comfort position shown in FIG. 6, with the track lock means in its locked configuration.
Figure 13:
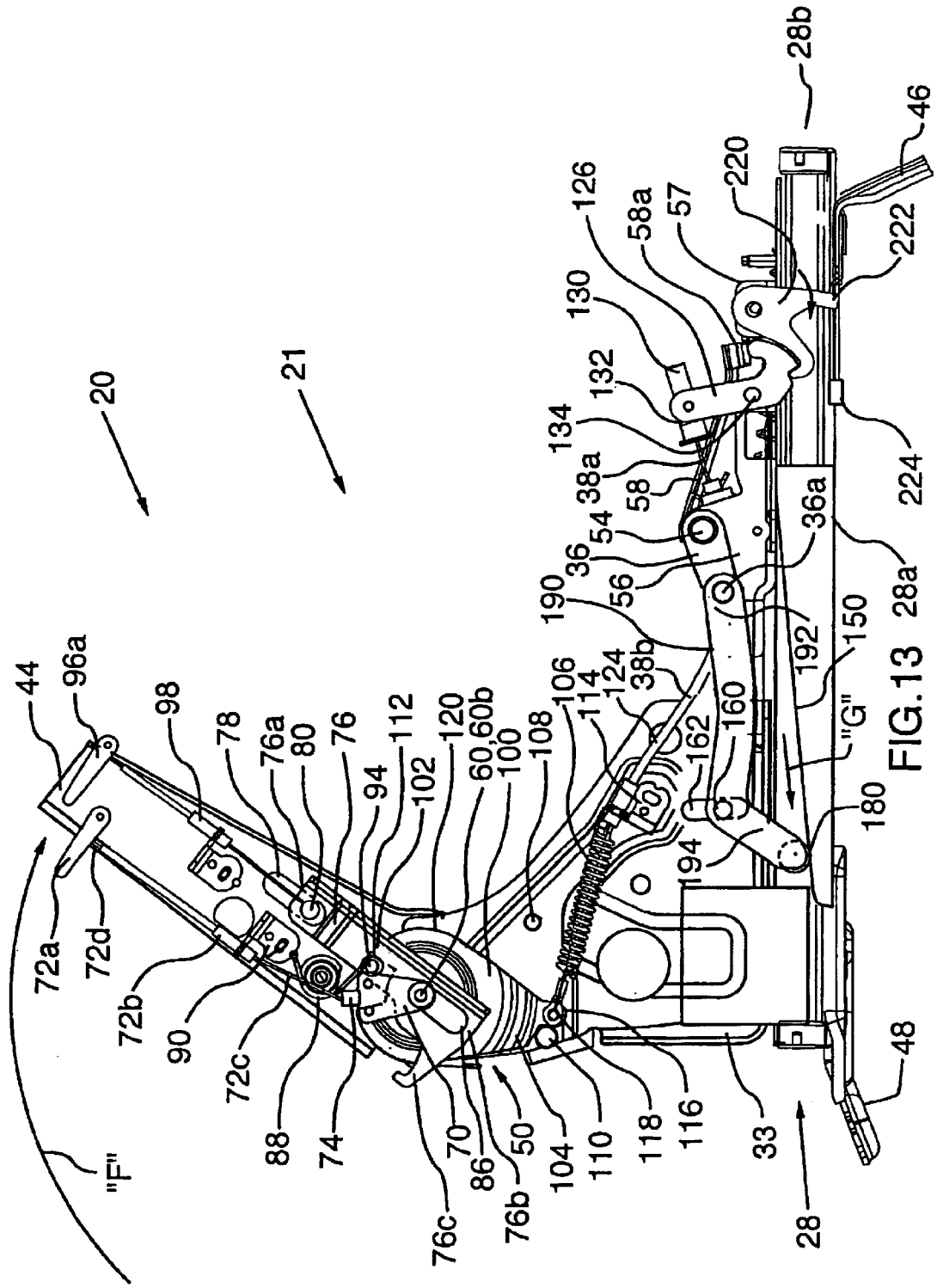
FIG. 13 is a cross-sectional right side elevational view similar to FIG. 12, but with the seat assembly being slid rearwardly towards its predetermined rear longitudinal position.
Figure 14:
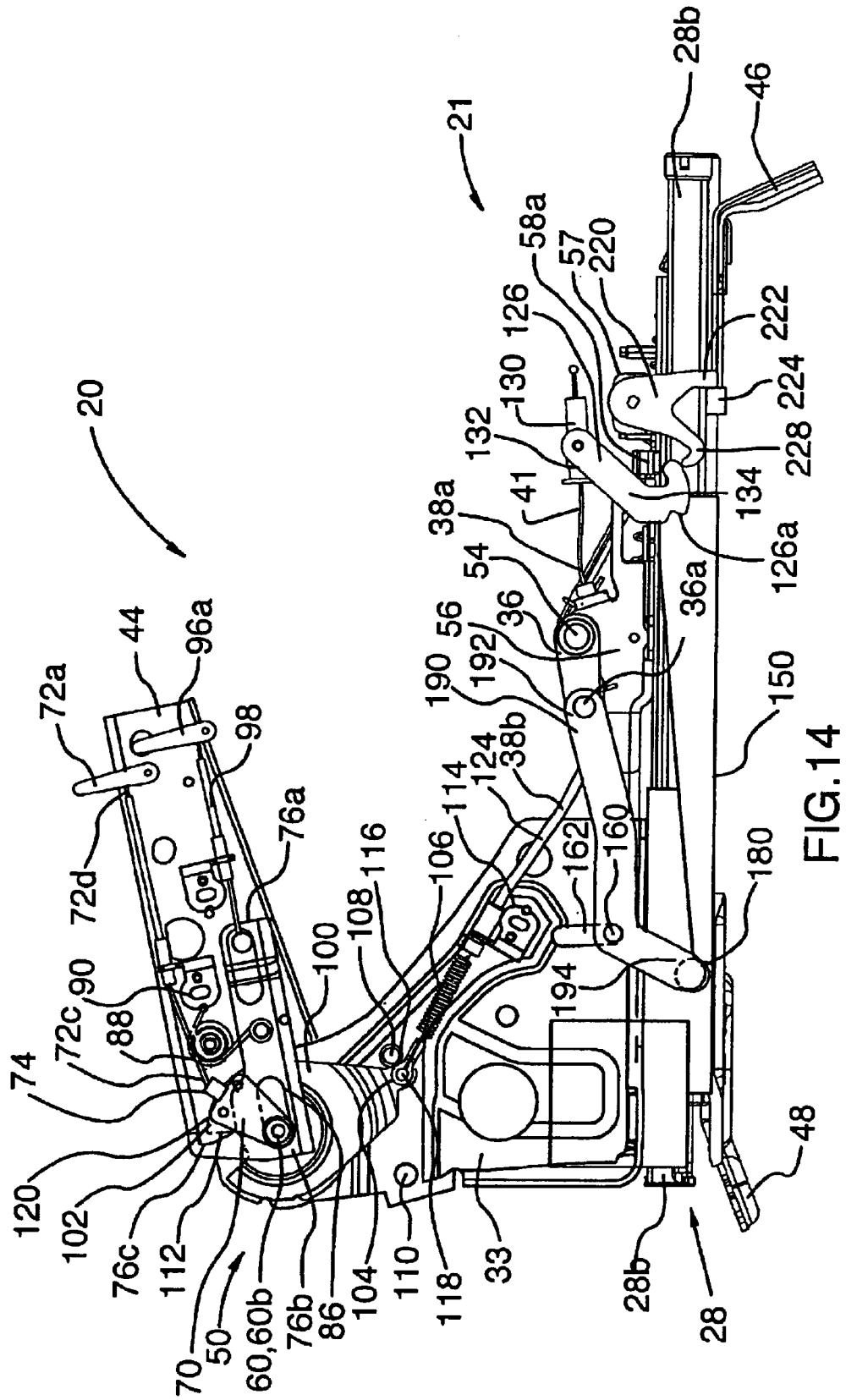
FIG. 14 is a right side elevational view similar to FIG. 13, but with the seatback member in its substantially horizontal load supporting position and the seat assembly having reached its predetermined rear longitudinal position.
Figure 15:
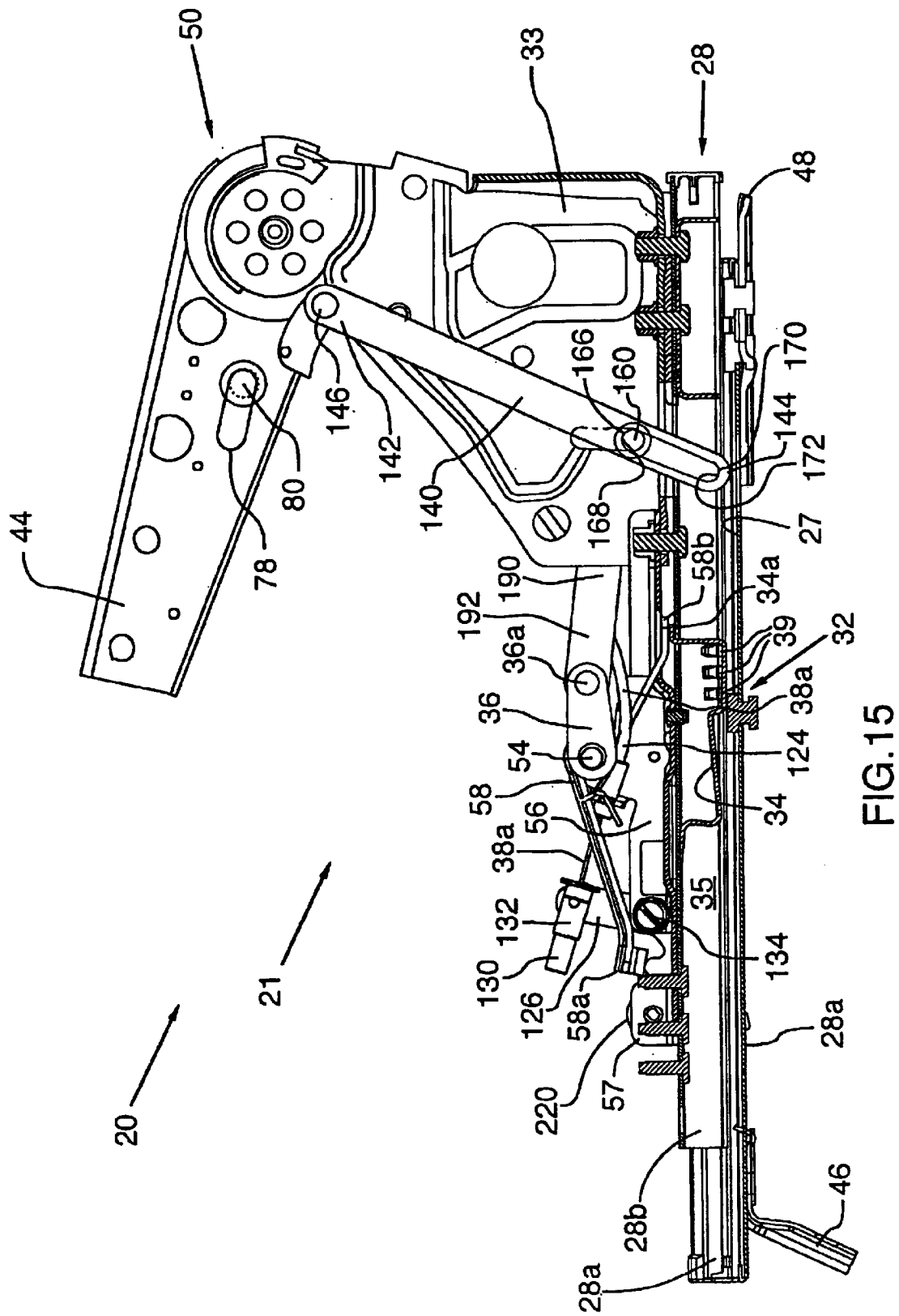
FIG. 15 is a cross-sectional left side elevational view with the seatback member in its substantially horizontal load supporting position and the seat assembly having reached its predetermined rear longitudinal position, as in FIG. 14.

As can be best seen in FIGS. 5 through 7, 9 through 15, and 19, the track lock means 32 includes a track lock actuator member 34 positioned within a cavity 35 defined between the fixed track member 28a and the movable track member 28b, for operative engagement with the teeth 39 of the track lock means 32. The track lock actuator member 34 has an upper portion 34a that protrudes upwardly through the movable track member 28b (as best seen in FIGS. 7 and 15). When the track lock actuator member 34 is in a raised position, as can be best seen in FIG. 7, the track lock actuator member 34 engages the teeth 39 to lock the movable track member 28b with respect to the fixed track member 28a.

When the track lock actuator member 34 is pushed downwardly to a released position, as best seen in FIGS. 12 through 15, it is removed from engaging the teeth 39, and the movable track member 28b and the seat assembly 21 are permitted to slide longitudinally with respect to the fixed track member 28a.

The track lock means 32 may be unlocked by lifting on a handlebar member 52 pivotally mounted by means of a crossbar member 54 on a mounting bracket 56. A rocker arm 58 is secured to the crossbar member 54 for rotation therewith. The back end portion 58b of the rocker arm 58 pushes downwardly on the upper portion 34a of the track lock actuator member 34, to move the track lock actuator member 34 downwardly, to thereby release the track lock actuator member 34 from the teeth 39.

The track lock means 32 includes a crank arm 36 pivotally moveable between a locked position, as is best seen in FIGS. 1 through 10, corresponding to the locked configuration of the track lock means 32 and a released position, as is best seen in FIGS. 11 through 15, corresponding to the released configuration of the track lock means 32.

The seat track assembly 28 preferably has a biasing coil spring 26, operatively interconnected between a bracket 29 rigidly mounted on the fixed track member 28a and a spring attachment bracket 31 rigidly mounted on the movable track member 28b. Release of the track lock means 32 allows the tensile force in spring 26 to pull the movable track member 28b forward relative to fixed track member 28a, thereby causing the seat assembly 21 to move forward as described above, when the track lock means 32 is released. It will be understood that other, mechanically equivalent known track assemblies may be used within the scope of the present invention.

The seat assembly 21 includes a seat cushion member 30 mounted on the right movable track member 28b and the left movable track member (not shown). More specifically, the seat cushion member 30 includes a right seat cushion bracket 33 rigidly mounted to the movable track member 28b and a left seat cushion bracket (not shown) rigidly mounted to the left movable track member (not shown). A seat cushion frame member has been omitted from all views for ease of illustration, but such seat cushion frame member is conventionally mounted to each of the seat cushion brackets, as is well known in the art, so as to provide a platform base for mounting of the seat cushioning 37 shown in phantom outline in FIG. 1.

The fold flat vehicle seat 20 shown in the Figures also includes a seatback member 40 having a frame member 42 rigidly attached at opposite lateral sides to right seatback mounting bracket 44 and the left seatback mounting bracket (not shown), which brackets are mirror images of one another. Cushioning material 45 of the seatback member 40 have generally been omitted from the figures for ease of illustration, but are conventionally mounted on the seatback frame member 42, and are shown in phantom outline in FIG. 1.

The seatback member 40 is mounted on the seat cushion member 30 for forward folding about a substantially horizontal seatback pivot axis "H" (See FIG. 2) between a substantially upright occupiable design position, as is best seen in FIGS. 1 through 8, and 16, and a substantially horizontal load supporting position, as is best seen in FIGS. 14 and 15.

More specifically, in the preferred embodiment illustrated, the right seatback mounting bracket 44 is mounted on the seat cushion member 30 by means of a known rotary recliner 50 operable between locked and unlocked configurations to selectively control pivotal movement of the seatback member 40 relative to the seat cushion member 30 about the substantially horizontal seatback pivot axis "H" upon locking and unlocking of the rotary recliner 50, as controlled through manual manipulation of first lever handle 72a. The rotary recliner 50 is also of known design, and can, for example, be of the same general type as described in U.S. Pat. No. 5,779,313, issued Jul. 14, 1998, the teachings of which patent are also hereby incorporated herein by reference. While other types of known rotary recliners have utility in this type of application, a specific form of rotary recliner shown and suitable for this application is available from Faurecia North America, of Troy, Mich., U.S.A., as Discontinuous Round Recliner Part No. 499202 (for right-handed applications) or Part No. 4999203 (for left-handed applications). A right-handed application, only, is shown, with a single rotary recliner 50 being utilized on the right hand side of the seat assembly 21.

A seatback member latch means is incorporated into the rotary recliner 50 and is operatively engaged between the seatback member 40 and the seat cushion member 30 to selectively control the forward folding of the seatback member 40 over the seat cushion member 30. The seatback member latch means includes an internal spring means (not shown) within the rotary recliner 50, which spring means biases the internal locking components of the rotary recliner 50 towards the locked configuration of the recliner 50, at which locked configuration the attached right seatback mounting bracket 44 is unable to rotate about the substantially horizontal seatback pivot axis "H".

The vehicle seat 20 further comprises a biasing means, namely a back return spring 43, for biasing the seatback member 40 toward the substantially horizontal load supporting position.

In the "E-Z entry" position, the seatback member 40 is partially forwardly folded over the seat cushion member 30 such that the seatback member 40 is disposed angularly between the substantially upright occupiable design position and the substantially horizontal load supporting position to facilitate ingress and egress to and from behind the seat assembly. Further, co-incident with said partial forward folding of the seatback member 40 during activation of the "E-Z entry" mode, the track lock means 32 has moved to its released configuration, as will be described in greater detail subsequently, to permit the longitudinal sliding movement of the movable track member 28b and the seat assembly 21 relative to the fixed track member 28a with the biasing assistance of the coil spring 26.

In order to activate the "E-Z entry" mechanism, the first lever handle 72a is used. The lever handle 72a is pivotally mounted on the seatback member 40 for indirect control of the control crank member 70, via a Bowden type sheathed cable 72b. A second end 72c of the Bowden cable 72b is connected to a hook portion 74 positioned on the recliner control crank member 70, and the opposite other first end 72d of the Bowden cable 72b is connected to the lever handle 72a for pulling activation thereof upon downward movement of the lever handle 72a, thereby to cause selective movement of the recliner control crank member 70 between the first (locked) and second (unlocked) crank positions against the biasing of the internal spring (not shown) within the rotary recliner 50.

An elongate link member 76, having opposed first 76a and second 76b ends, is connected adjacent said first end 76a to the seatback member 40 for sliding movement between first and second link positions as follows. The first end 76a of the link member 76 is preferably connected to the seatback member 40 by means of an elongate slot 78 formed in the seatback mounting bracket 44. A guide pin 80 is rigidly attached to the link member 76 adjacent the first end 76a of the link member 76, which guide pin 80 extends through the elongate slot 78 of the seatback mounting bracket to an enlarged inboard pin end 82 to retain the guide pin 80 in said elongate slot 78 upon said sliding movement of the link member 76.

Figure 3:
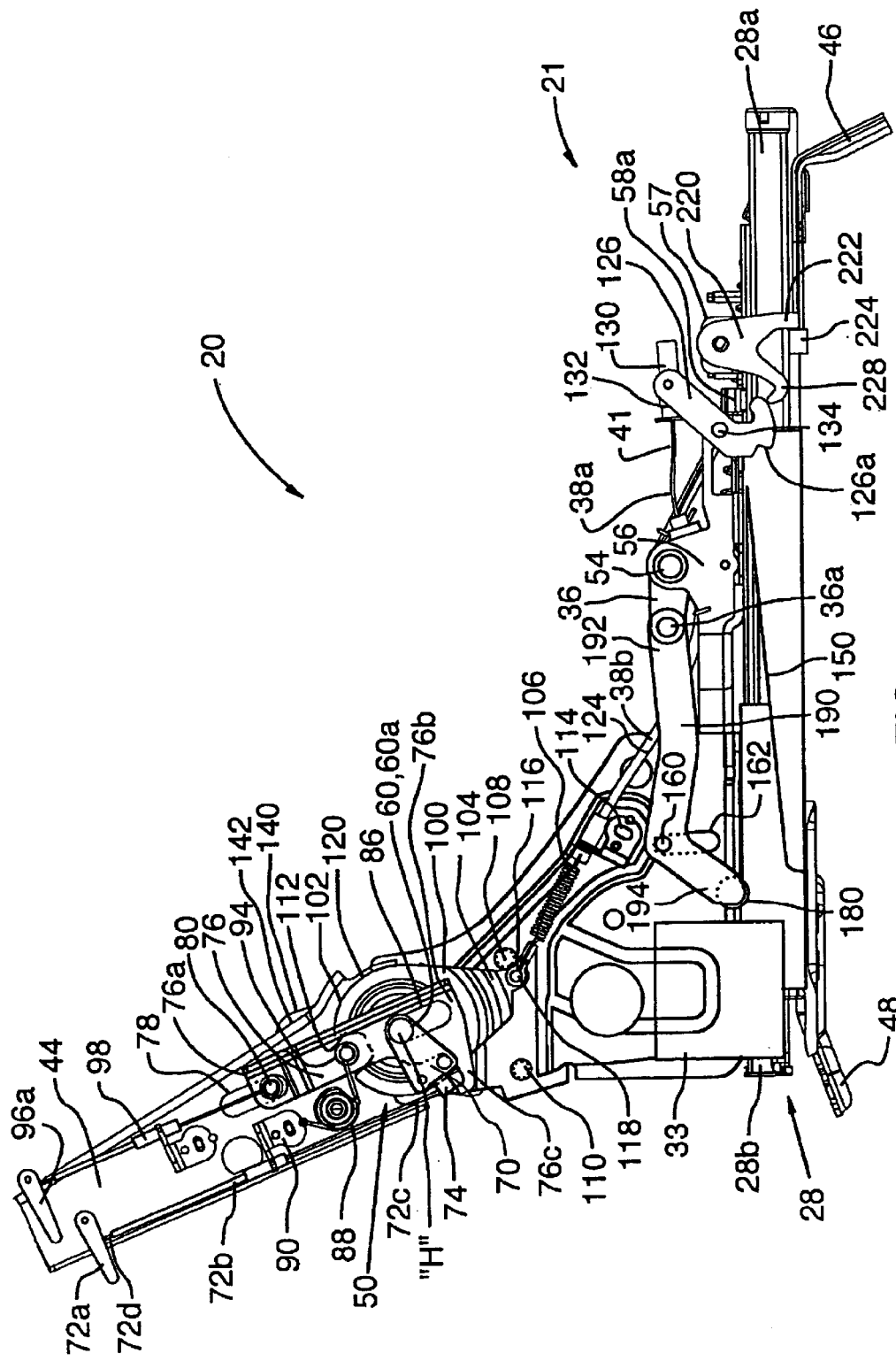
FIG. 3 is a right side elevational view of the right half of the fold flat vehicle seat of FIG. 1.
Figure 8:
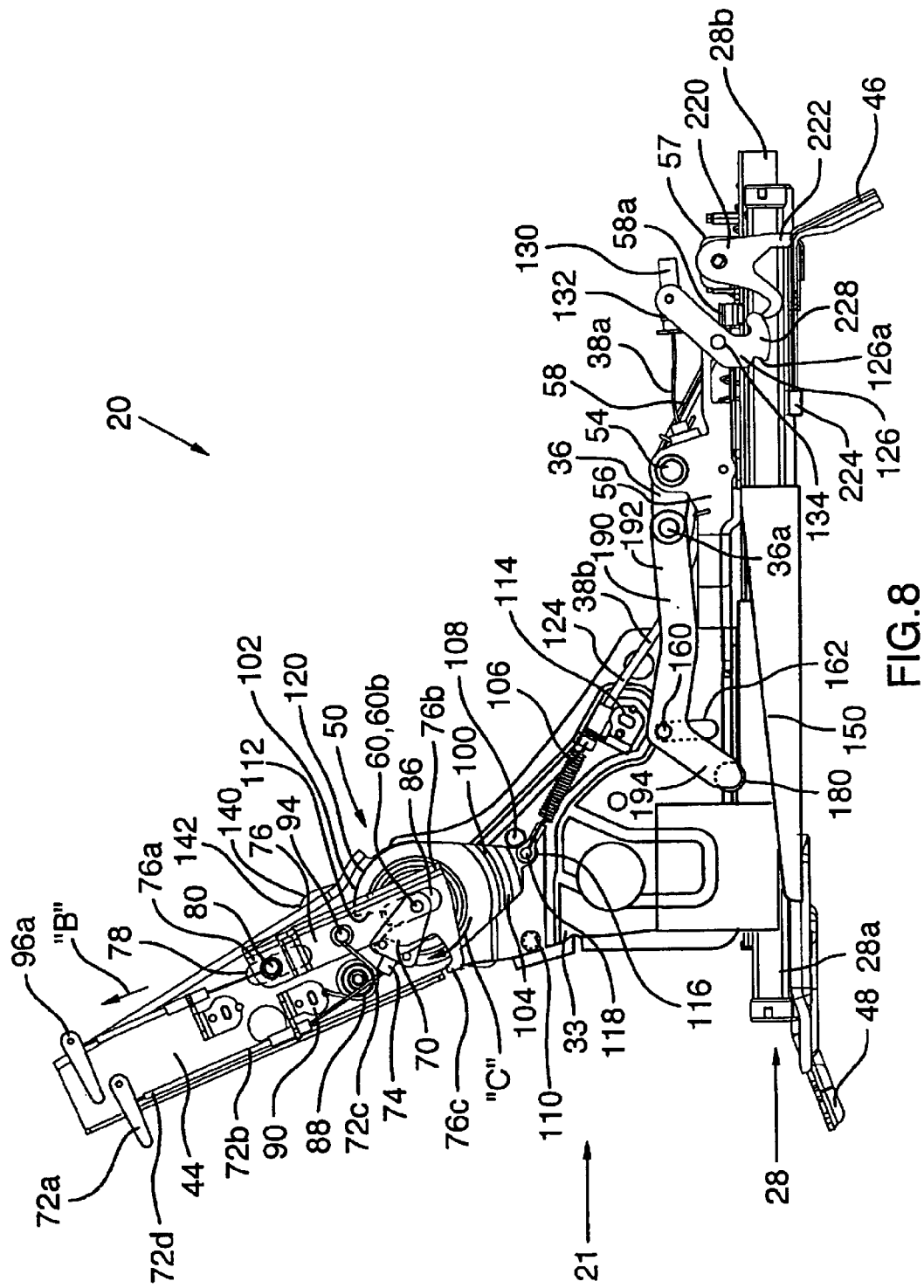
FIG. 8 is a right side elevational view similar to FIG. 6, but with the seat assembly in a forward comfort position and the second (i.e.: the forward) lever handle having been lifted to release the rotary recliner, to thereby permit movement of the seat assembly to the substantially horizontal load supporting position.

The link member 76 is connected adjacent its second end 76b about a pivot point defined by the central axis of the control shaft 60 by means of an elongate slot 86 formed in the link member 76. The control shaft 60 passes through the elongate slot 86 so as to be pivotally movable with respect to the link member 76, and for rigid attachment as aforesaid of its outboard free end 60b to the recliner control crank member 70. In this manner, the second end 76b of the elongate link member 76 is connected to a pivot point on the control shaft 60 for pivotal movement around the substantially horizontal seatback pivot axis "H" concurrent with pivotal movement of the seatback member 40 relative to the seat cushion member 30, and for sliding movement of the link member 76 transverse to the substantially horizontal seatback pivot axis "H", between a lower position, as best seen in FIG. 3, and an upper position as best seen in FIGS. 8 and 16.

A torsion spring 88 biases the link member 76 towards the lower position. The torsion spring 88 is operatively attached at one of its ends end to a backrest bracket 90, and at its other end to a cam pin 94 rigidly mounted on the link member 76 proximate to its mid-section.

The link member 76 has a transversely extending foot portion 76c adjacent its second end 76b, which foot portion 76c is dimensioned and otherwise adapted to engage the recliner control crank member 70 upon said sliding movement of said link member 76 from its lower position to its upper position. When the link member 76 has moved to its upper position, the recliner control crank member 70 is moved to its second crank position, thus unlocking the rotary recliner 50, and thereby allowing the seatback member 40 to pivot about the substantially horizontal seatback pivot axis "H".

An interlock plate 100 is mounted on the seat cushion member 30 in rotatable relation to the substantially horizontal seatback pivot axis "H" for rotation with the seatback mounting bracket 44 between a first rotational limit position corresponding to the substantially upright occupiable design position and a second rotational limit position corresponding to the "E-Z entry" position of the seatback member 40. In the first rotational limit position, the front edge of a lower leg portion 104 of the interlock plate 100 contacts a first stop pin 108 rigidly mounted on the seat cushion bracket 33. In the second rotational limit position, the rear edge of the lower leg portion 104 of the interlock plate means 100 contacts a second stop pin 110 rigidly mounted on the seat cushion bracket 33. The interlock plate 100 is biased towards its first rotational position by means of a coil spring 106 interconnected between a bracket 114 attached to the seat cushion bracket 33 and the lower leg 104 of the interlock plate 100, the latter connection being through a mounting eye 116 pivotally attached to a mounting stud 118, rigidly attached to the lower leg 104 of the interlock plate 100.

The interlock plate 100 has a top edge 102 which defines a convexly arcuate cam pin follower surface 120 having a camming shoulder 112.

The cam pin 94 is mounted, as previously described, on the link member 76 for driving engagement with the camming shoulder 112, to cause the aforementioned rotation of the interlock plate 100 from the first rotational limit position to the second rotational limit position upon forward pivotal movement of the seatback member 40.

A second Bowden type sheathed cable, generally designated by reference numeral 124, is interconnected between the interlock plate 100 and the track lock means 32 for unlocking the track lock means 32 when the interlock plate 100 is rotated, toward its second rotational limit position. The second Bowden type sheathed cable has an outer fixed sheath portion 38b and an inner cable portion 38a operatively sliding therein.

The first end 41 of the Bowden cable is fitted with a cylindrically shaped connector member 130 having a laterally projecting connection socket portion 132 that pivotally connects to a lever arm 126. The lever arm 126 is pivotally mounted, by means of a pivot pin 134, on an upwardly bent portion of a large mounting bracket 56 secured to the movable track member 28b, for movement between a releasing position whereat the first lever arm 126 causes the track lock means 32 to move to the released configuration and a locking position whereat the first lever arm 126 permits the track lock means 32 to move to the locked configuration. Thus, forward folding movement of the seatback member 40 a threshold distance from its substantially upright occupiable design position toward its substantially horizontal load supporting position causes the first lever arm 126 to move correspondingly from its locking position to its releasing position. Such forward folding of the seatback member 40 causes pulling movement of the inner cable portion 38a in the direction of arrow "R" of FIG. 16, which in turn causes, the connector member 130 to move in the direction of arrow "S" of that Figure, which in turn, causes pivotal movement of the lever arm 126 about pivot pin 134 in the direction of arrow "X" in FIG. 16. Such pivotal movement causes the lever arm 126 to lift a forward end 58a of the rocker arm 58, which causes a rearward end 58b of the rocker arm 58 to move downwardly. This downward movement of the rearward end 58b of the rocker arm 58 causes the track lock means 32 to move to its released configuration, in the manner previously disclosed.

It will also be appreciated that if a second lever handle 96a is released by a user while the seatback member 40 is in its "E-Z entry" position, the coil spring 106 will return the interlock plate 100 to its first rotational limit position.

In order to fold the seatback member 40 fully forwardly to its substantially horizontal load supporting position, a manually manipulable second lever handle 96a is used, as is best seen in FIGS. 8 and 18. The manually manipulable second lever handle 96a is pivotally mounted on the seatback member 40 for indirect control by a user of the link member 76, via a Bowden type sheathed cable 98, for selective movement of the link member 76 between its lower and upper positions against the biasing of the torsion spring 88 upon pivotal movement of the lever handle member 96a from a lower rest position, as best seen in FIG. 3, and a raised actuating position, as best seen in FIGS. 8 through 18.

When the link member 76 is in its upper position, as will occur when the lever handle 96a is moved upwardly, the cam pin 94 will clear the camming shoulder 112, thereby avoiding any rotation of the interlock plate 100 from its first rotational limit position. In this manner, the seatback member 40 can be forwardly folded to its substantially horizontal load supporting position.

The fold flat vehicle seat 20 also comprises a downwardly and rearwardly sloped ramp means 150. In the preferred embodiment illustrated, the ramp means 150 comprises an upwardly and rearwardly facing ramp having an upper forward end and a lower rearward end. Other configurations of the ramp means 150 are also possible. The downwardly and rearwardly sloped ramp means 150 is operatively mounted in fixed relation with respect to the fixed track member by means of welding, or alternatively by suitable threaded fasteners (not shown).

A drive link assembly includes a link arm member 140 having an upper end 142 and a lower end 144. The link arm member 140 is mounted adjacent its upper end 142 to the seatback member 40 by means of a pivot pin 146 for pivotal movement with respect to the seatback member 40. The link arm member 140 is also mounted adjacent its lower end 144 to the seat cushion member 30 for translational movement with respect to the seat cushion member 30, by means of a mounting pin 160 slidably engaged in a guide slot 162 formed on the seat cushion member 30, as will be discussed in greater detail subsequently.

Figure 4:
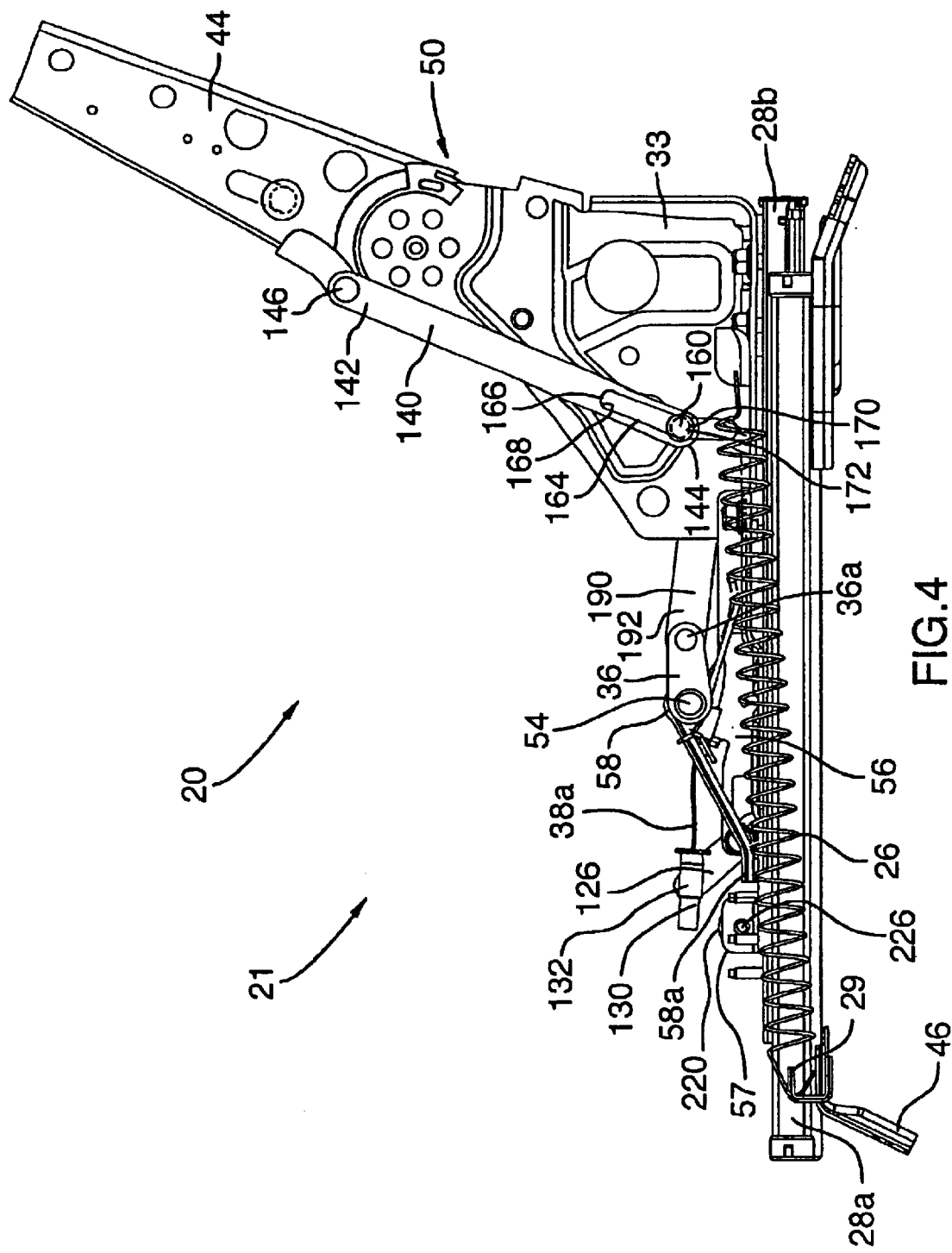
FIG. 4 is a left side elevational view of the right half of the fold flat vehicle seat of FIG. 1.
Figure 5:
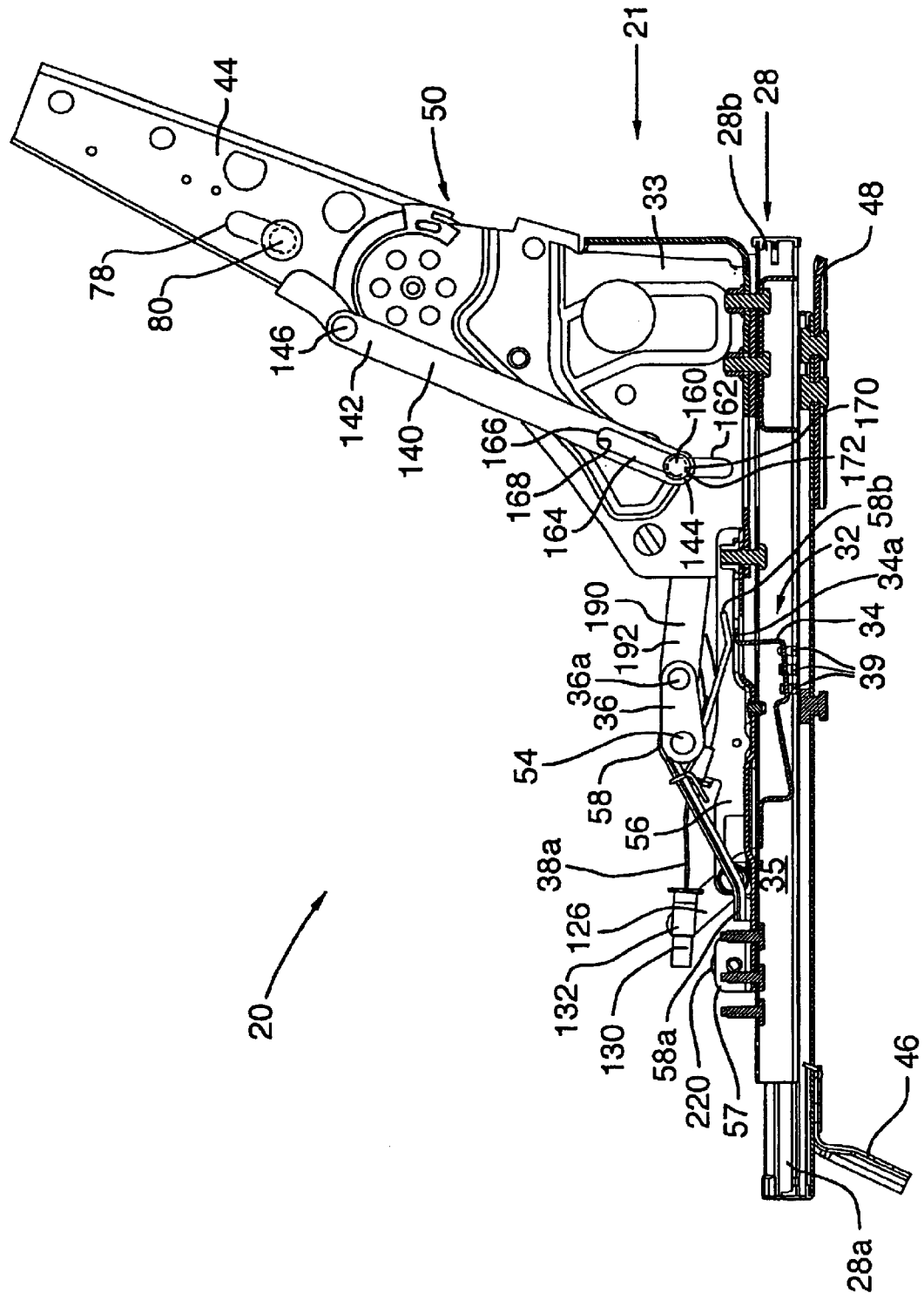
FIG. 5 is a cross-sectional left side elevational view similar to FIG. 5, taken along section line 5—5 of FIG. 1.
Figure 6:
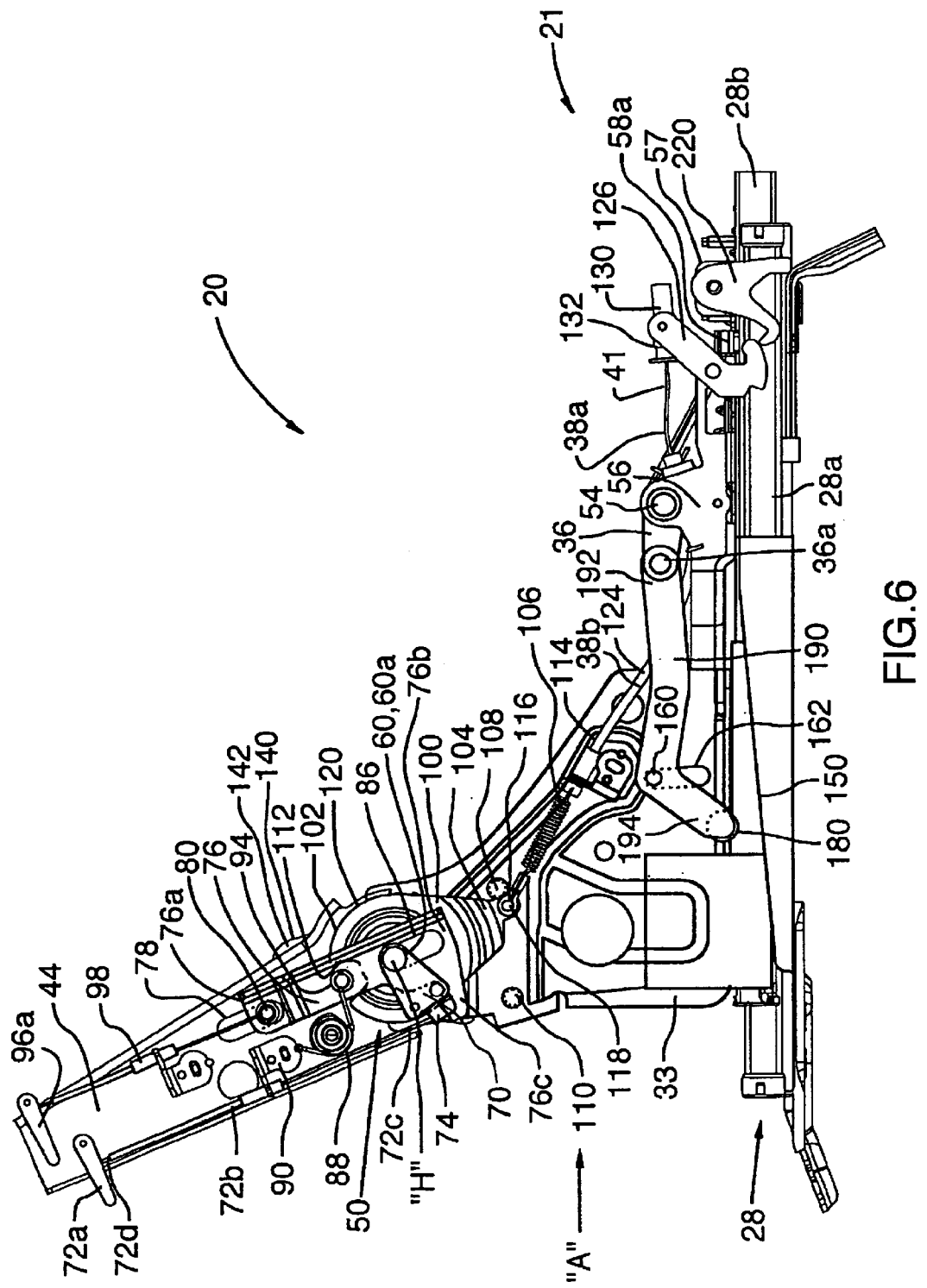
FIG. 6 is a cross-sectional left side elevational view similar to FIG. 5, but with the seat assembly in a forward comfort position.

In the above described manner, the link arm member 140 is mounted for travel with respect to the seat cushion member 30, between a raised rest position, as can be best seen in FIGS. 4, 5, and 7, and a lowered ramp-contact position, as can be best seen in FIGS. 10 through 14. The raised rest position corresponds to the upright occupiable design position of the seatback member 40, and the lowered ramp-contact position corresponds to the substantially horizontal load supporting position of the seatback member 40.

The link arm member 140 includes a longitudinally oriented lost-motion slot 164 disposed adjacent the lower end 144 thereof. The lost-motion slot 164 is oriented along the length of the link arm member 140 and has an upper end 166 defining a drive contact surface 168 and a lower end 170 defining a return contact surface 172. The mounting pin 160 is slidably engaged within the lost-motion slot 164 for travel between the drive contact surface 168 and the return contact surface 172.

When the seatback member 40 is in its E-Z entry position, as can be best seen in FIGS. 16 through 18, the link arm member 140 is in an intermediate position, as is best seen in FIG. 17, between the raised rest position and the lowered ramp contact position. When the link arm member 140 is between the raised rest position and the intermediate position, the drive contact surface 168 of the lost-motion slot 164 is disposed in spaced relation from the mounting pin 160. When the link arm member 140 is in the intermediate position, as can be best seen in FIG. 17, the drive contact surface 168 of the lost-motion slot 164 comes into contact with the mounting pin 160. When the link arm member 140 is further moved from the intermediate position to the lowermost position, as can be best seen in FIG. 15, the drive contact surface 168 of the lost-motion slot 164 is pushing downwardly on the mounting pin 160, as will be discussed in greater detail subsequently.

The drive link assembly also has a ramp contact member 180 operatively mounted on the seatback member for translational engagement of the ramp contact member 180 with the downwardly and rearwardly sloped ramp means 150. In the preferred embodiment illustrated, the ramp contact member 180 comprises a roller 180, but may also comprise a fixed piece of low friction plastic material, or the like.

The drive link assembly further includes a rocker arm member 190 having a captured end 192 and a free end 194. The rocker arm member 190 is connected between its captured end 192 and its free end 194 for pivotal movement to the link arm member 140 adjacent the lower end of the link arm member 140, by means of the mounting pin 160. The rocker arm member 190 is connected for pivotal movement in this manner, for travel with the link arm member 140 between a start position, as is best seen in FIGS. 1 through 11, and an end position, as is best seen in FIGS. 12 through 15, corresponding to the lowermost position of the link arm member 140. In the preferred embodiment illustrated, the roller 180 is mounted for rotation adjacent the captured end 192 of the rocker arm member 190.

When the rocker arm member 190 is in the start position, the ramp contact member 180 is disposed in spaced relation above the upwardly and rearwardly facing ramp 150, as can be best seen in FIGS. 1, 2, 3, 6, 8 and 9. The rocker arm member 190 also has an initial contact position, as can be best seen in FIG. 11, between the start position and the end position. In the initial contact position, the ramp contact member 180 initially contacts the upwardly and rearwardly facing ramp 150 adjacent the upper forward end of the ramp 150. The rocker arm member 190 is moved from its start position to its initial contact position when the link arm member 140 is moved from its raised rest position to its lowered ramp-contact position by the seatback member 40 being folded forwardly.

The rocker arm member 190 is also pivotally connected adjacent its captured end 192 to the crank arm 36 by means of a pivot pin 36a, for movement of the captured end 192 with the crank arm 36 between the locked position of the crank arm 36, whereat the track lock means 32 is in its locked configuration, and the released position of the crank arm 36, whereat the track lock means 32 is in its locked configuration. When the rocker arm member 190 is in its initial contact position, as caused by downward pushing of the link arm member 140, continued downward pushing of the link arm member 140 caused by forward pivotal folding movement of the seatback member 40, causes the crank arm 36 to move from its locked position to its released position, thus releasing the track lock means 40. Accordingly, the movable track member 28b and seat assembly 21 are permitted to move longitudinally relative to the fixed track member 28a.

As can be discerned from the above description of the drive link assembly, the link arm member 140 is mounted for translational movement with respect to the seat cushion member 30, such that as the seatback member 40 is forwardly folded about the seatback pivot axis "H" from the upright occupiable design position to the substantially horizontal load supporting position, the track lock means 32 moves to the released configuration, and the ramp contact member 180 moves downwardly and rearwardly along the downwardly and rearwardly sloped ramp means 150, as indicated by arrow "G" in FIG. 13. The movement of the ramp contact member 180 downwardly and rearwardly along the downwardly and rearwardly sloped ramp means 150, causes rearward longitudinal movement of the movable track member 28b and the seat assembly 21 relative to the fixed track member 28a to a predetermined rear longitudinal position as shown in FIG. 14. Preferably, when the seat assembly 21 is in its predetermined rear longitudinal position and the rocker arm member 190 is in its end position, the roller 180 is disposed off the end of the upwardly and rearwardly facing ramp means 150. In this manner, the predetermined rear longitudinal position of the seat assembly 21 is specifically defined.

The operation of the fold flat vehicle seat 20 will now be discussed, with reference to FIGS. 8 through 15. The situation wherein a user wishes to move the seatback member 40 from its upright occupiable design position, as best seen in FIG. 8, to its substantially horizontal load supporting position, as best seen in FIGS. 14 and 15, without activation of the "E-Z entry" mechanism, will be considered first. As is shown in FIG. 8, with the seatback member 40 in the design position, a user would grasp the second lever handle 96a, and pull it upwardly, so as to cause operatively upward movement of the Bowden type sheathed cable 98, in the direction of arrow "B". This action, in turn, causes the link member 76 to slide upwardly in the same direction, carrying with it the cam pin 94 past the camming shoulder 112. The foot portion 76c of link member 76 lifts the button fastener 74 positioned on the control crank member 70. Continued upward sliding of the link member 76 in this manner causes the control crank member 70 to rotate in a clockwise direction (as shown by arrow "C") to the second crank position, to thereby unlock the rotary recliner 50, as previously discussed. This unlocking action allows the seatback member 40 to be folded forwardly about the substantially horizontal seatback pivot axis "H" to the substantially horizontal load supporting position shown in FIGS. 14 and 15.

Figure 9:
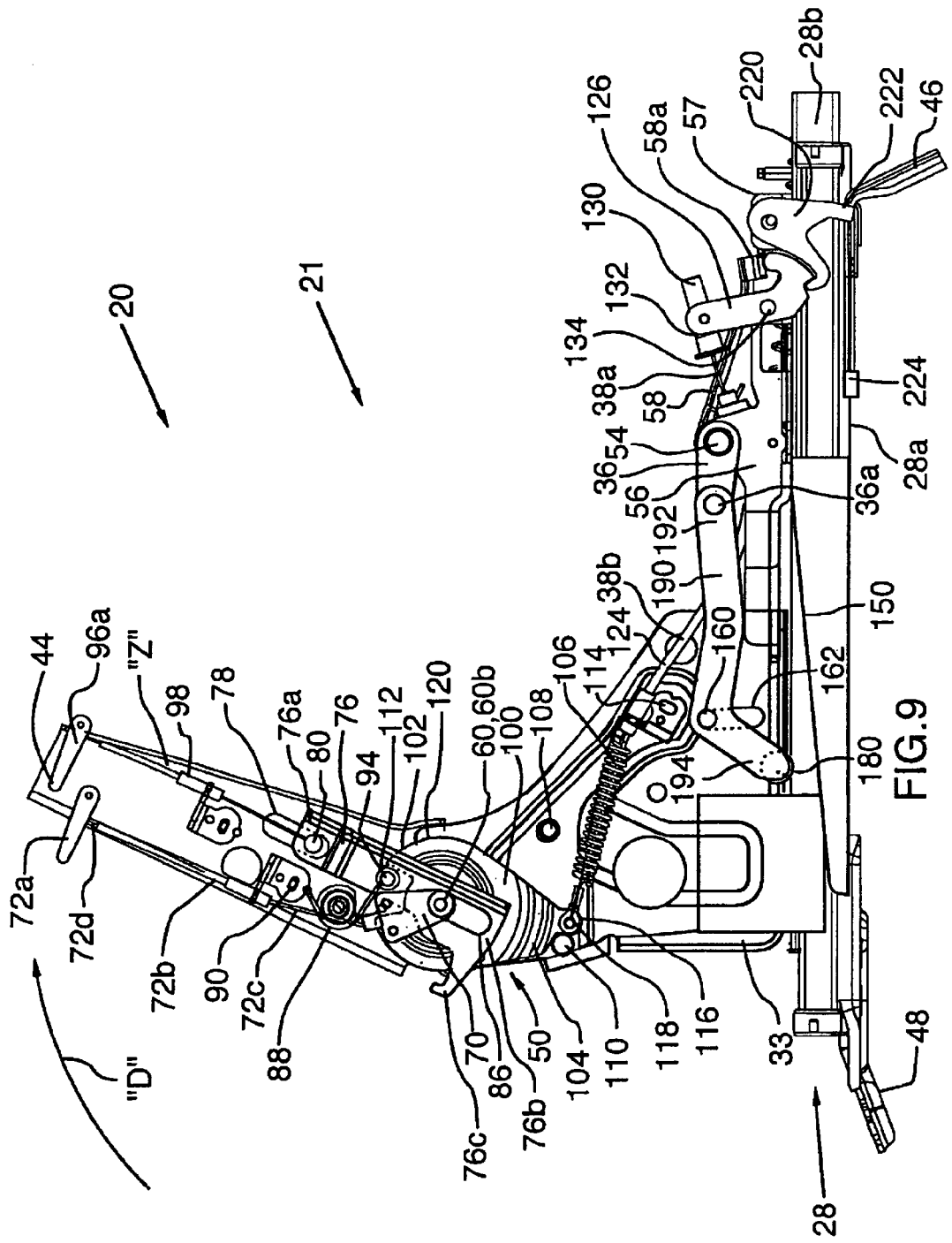
FIG. 9 is a cross-sectional right side elevational view similar to FIG. 8, but with the seatback having been folded forwardly to the same seatback angle as in the "E-Z entry" position, such that the drive contact surface of the lost-motion slot of the link arm member is engaging the pivot pin.
Figure 10:
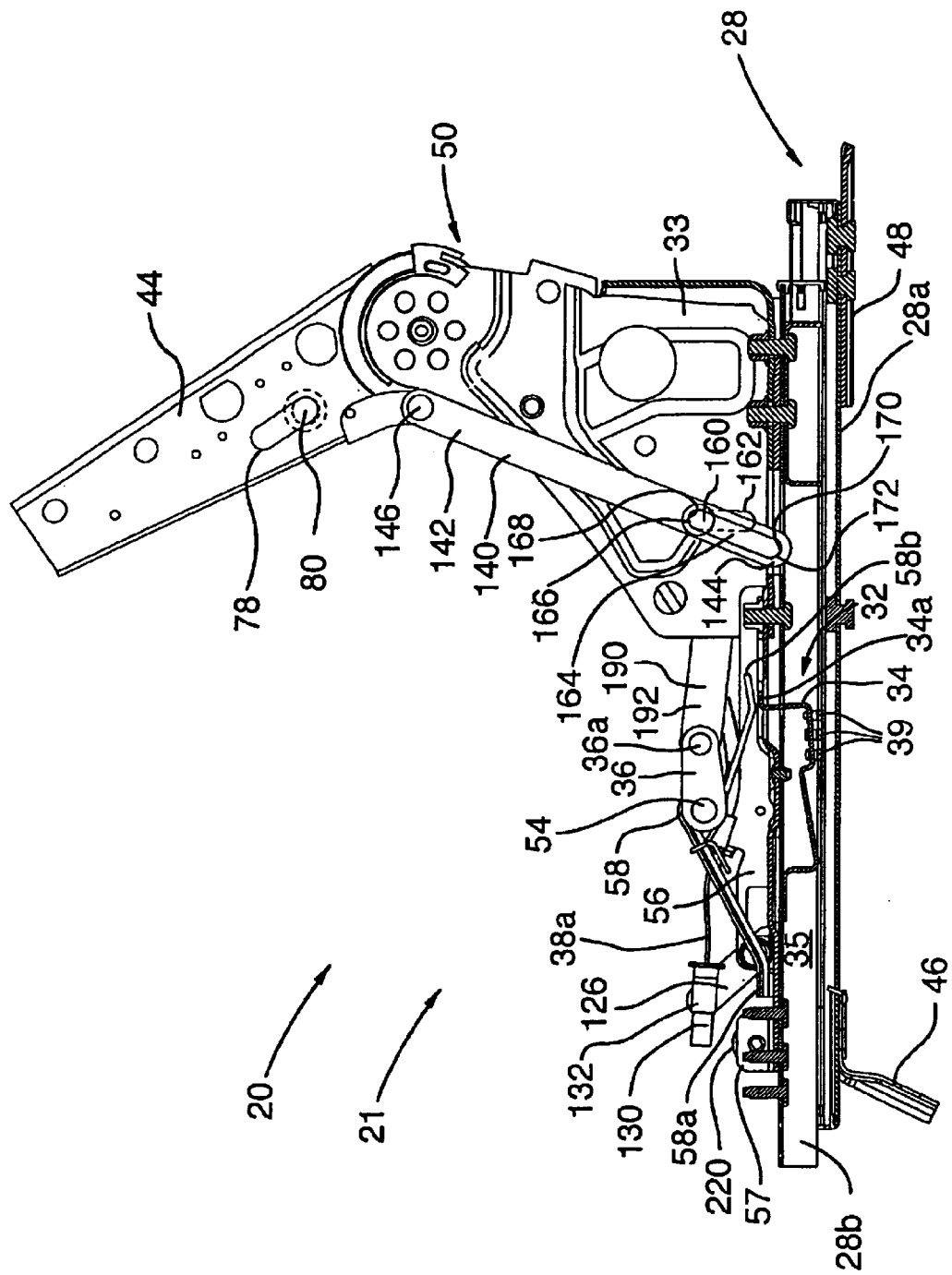
FIG. 10 is a cross-sectional left side elevational view with the seatback having been folded forwardly to the same seatback angle as in the "E-Z entry" position, as shown in FIG. 9.
Figure 11:
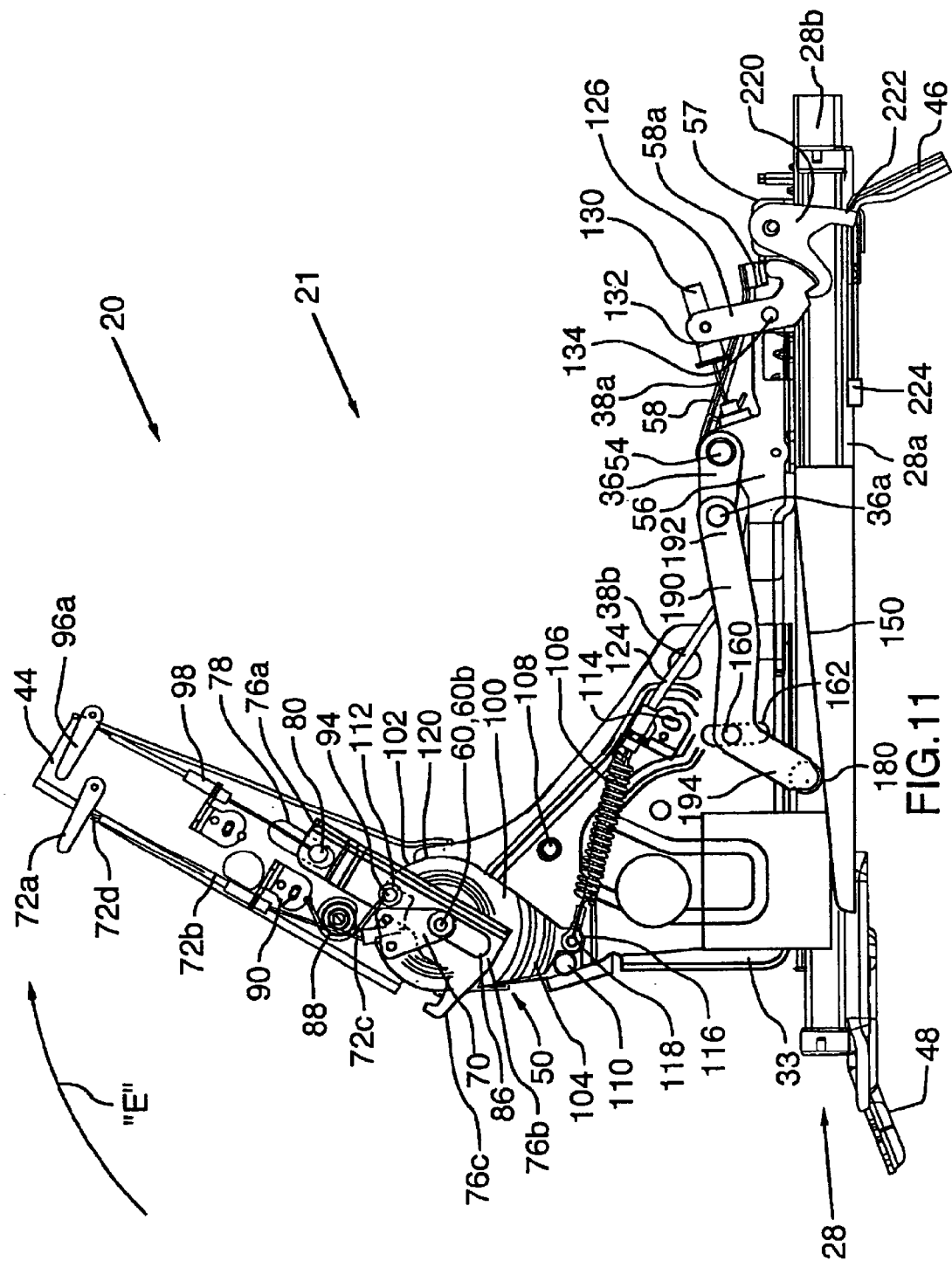
FIG. 11 is a cross-sectional right side elevational view similar to FIG. 9, but with the seatback having been folded forwardly with the ramp contact means having initially contacted the downwardly and rearwardly sloped ramp.
Figure 12:
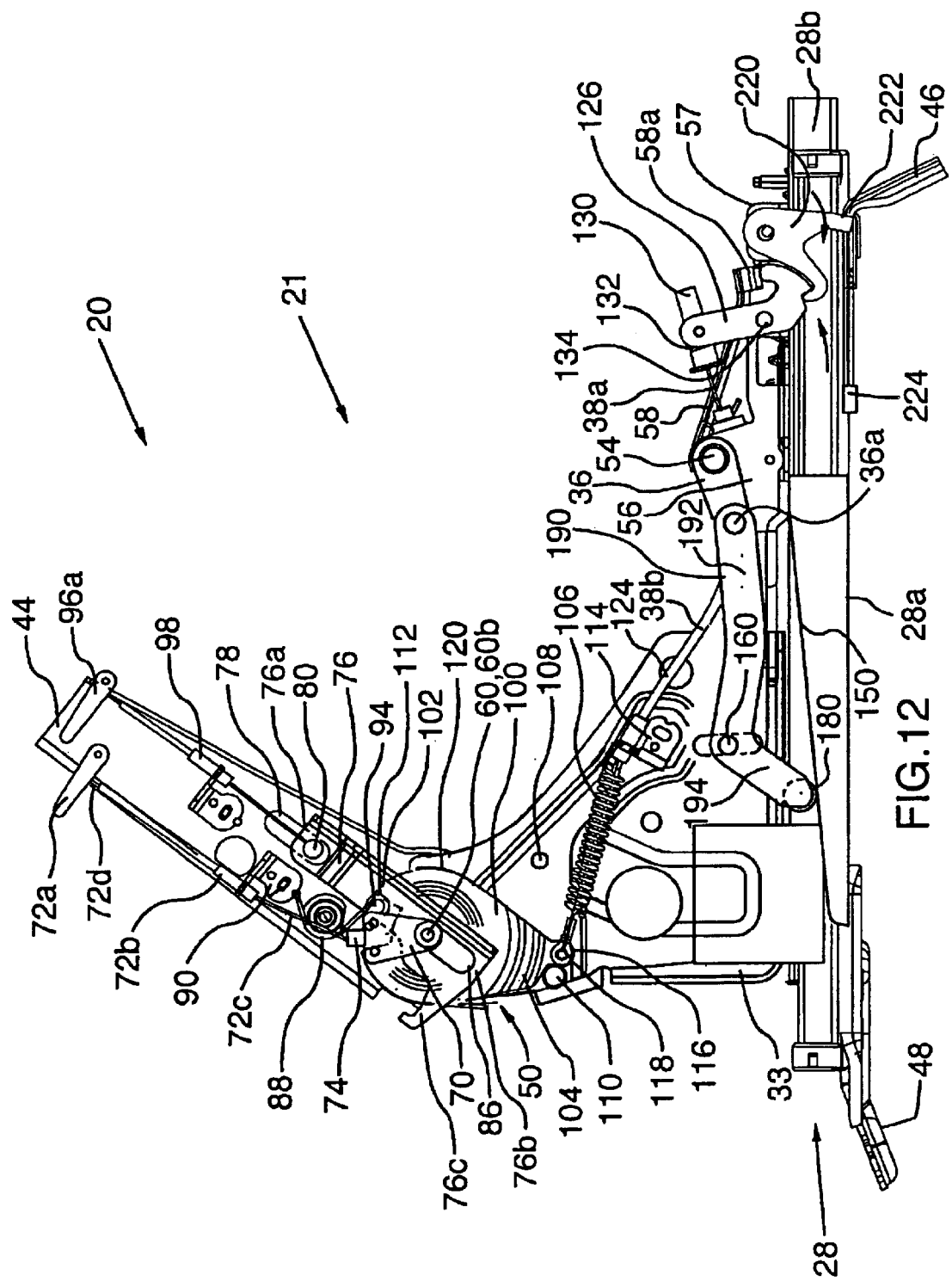
FIG. 12 is a cross-sectional right side elevational view similar to FIG. 11, but with the crank arm having been pushed down to its released position, thereby causing the track lock to be in its released configuration.

As can be seen in FIG. 9, when the seatback member 40 is folded to the forwardly folded angle corresponding to "E-Z entry" position, as indicated by arrow "D", the drive contact surface 168 of the lost motion slot engages the mounting pin 160. The seatback member 40 then folds forwardly even more, as indicate by arrow "E" in FIG. 11, from the position shown in FIG. 9, to the position as shown in FIG. 11, whereat the roller 180 initially contacts the downwardly and rearwardly sloped ramp means 150, which is the initial contact position of the rocker arm member 190. As the link arm member 140 continues to push downwardly, the crank arm 36 is moved from its locked position to its released position, as is shown in FIG. 12, thus permitting the movable track member 28b and the seatback assembly 21 to move longitudinally relative to the fixed track member 28a. Continued downward movement of the link arm member 140, as indicated by arrow "F" in FIG. 13, as caused by the forward folding of the seatback member 40 to its substantially horizontal load supporting position, in turn causes the roller 180 to roll downwardly and rearwardly along the downwardly and rearwardly sloped ramp means 150, as indicated by arrow "G" in FIG. 13, to the end of the ramp means 150, as shown in FIG. 14. At this point, the seat assembly 21 is in its predetermined rear longitudinal position.

When the user wishes to return the seatback member 40 to its substantially upright occupiable design position, the rotary recliner 50 is again unlocked using the second lever handle 96a and the seatback member 40 is thereafter manually pivoted rearwardly and upwardly until the seatback is in the correct position. During such movement, the seatback member 40 lifts the link arm member 140. The return contact surface 172 of the lost-motion slot 164 pushes upwardly on the mounting pin 160, which in turn lifts the rocker arm member 190 back to its start position and permits the crank arm 36 to return to its locked position.

Figure 19:
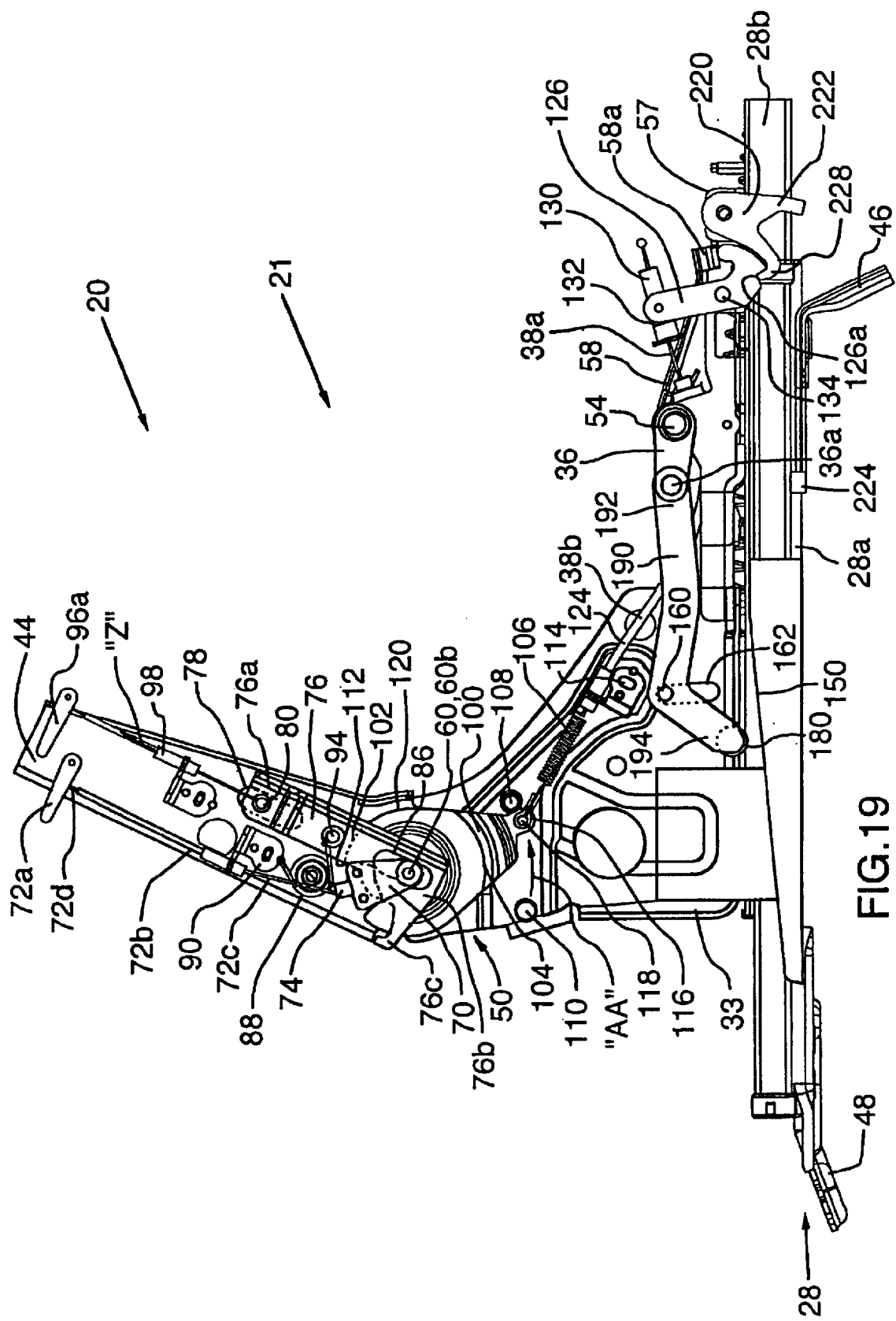

The situation wherein a user wishes to move the seatback member 40 from its upright occupiable design position, as best seen in FIGS. 14 and 15, to its "E-Z entry" position, as best seen in FIGS. 16 through 19, and then move the seat assembly to its predetermined rear longitudinal position, will now be discussed. As is shown in FIG. 16, with the seatback member 40 in the design position, a user would grasp the first lever handle 72a, and pull it upwardly, as indicated by arrow "T", so as to cause operatively upward movement of the Bowden type sheathed cable 72b. This action, in turn, causes the control crank member 70 to rotate in a clockwise direction (as shown by arrow "U") to the second crank position, to thereby unlock the rotary recliner 50, as previously discussed. This unlocking action allows the seatback member 40 to be folded forwardly about the substantially horizontal seatback pivot axis "H", as indicated by arrow "V" in FIG. 17. The track lock means is also unlocked, as seen in FIG. 17 and as discussed previously, via the Bowden type sheathed cable generally designated by reference numeral 124, the lever arm 126, and the rocker arm 58. The coil spring 26 pulls the seat assembly 21 forwardly, as indicated by arrow "W", to the "E-Z entry" position as shown in FIGS. 17 through 19.

As discussed earlier, the lever arm 126 is pivoted as indicated by arrow "X" in FIG. 17 by the pulling action of the Bowden type sheathed cable 124, to thereby release the track lock means 32. Since the seat assembly 21 has moved forwardly to its "E-Z entry" position, the bifurcated catch plate 220 moves to its hold-open position, as indicated by arrow "Y" in FIG. 17, under the biasing of the coil spring 226.

FIG. 19 shows the second lever handle 96a being lifted upwardly, as indicated by arrow "Z", in the same manner as in FIG. 8, to thereby permit the seatback member 40 to fold forwardly to its substantially horizontal load supporting position and the seat assembly to move to its predetermined rear longitudinal position, in the same manner as is discussed with reference to FIGS. 11 through 15. When the lever handle 96a is moved upwardly, the link member 76 is moved to its upper position. The cam pin 94 correspondingly clears the camming shoulder 112, thereby permitting the coil spring 106 to return the interlock plate 100 to its first rotational limit position, as indicated by arrow "AA" in FIG. 19.

As can be understood from the above description and from the accompanying drawings, the present invention provides a fold flat vehicle seat that is adaptable to various vehicle seat configurations, irrespective of the specific vehicle seat, that does not significantly protrude into the passenger envelope during forward folding of the seatback member, that does not interfere with passengers during forward folding of the seatback member, that is safe for passengers during forward folding of the seatback member, that is capable of significantly more rearward longitudinal travel than prior art mechanisms of similar functionality, during forward folding of the seatback member to a fully forwardly folded position, that has utility in larger vehicles, and that is relatively inexpensive to manufacture, as compared to prior art vehicle seats having similar composite functionality, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the fold flat vehicle seat of the present invention without departing from the spirit and scope of the accompanying claims.

We claim:

1. A fold flat vehicle seat comprising:
   a movable track member slidably engaging a fixed track member and having a seat assembly mounted thereon for longitudinal sliding movement of said movable track member and said seat assembly relative to said fixed track member along a longitudinal axis;
   a track lock means operatively interconnected between said movable and fixed track members and movable between a locked configuration whereat said movable track member is precluded from moving longitudinally relative to said fixed track member and a released configuration whereat said movable track member is permitted to move longitudinally relative to said fixed track member;
   wherein said seat assembly includes a seat cushion member mounted on said movable track member and a seatback member mounted on said seat cushion member for forward folding about a seatback pivot axis between a substantially upright occupiable design position and a substantially horizontal load supporting position;
   a seatback member latch means operatively engaged between said seatback member and said seat cushion member to selectively control said forward folding of said seatback member;
   a downwardly and rearwardly sloped ramp means operatively mounted in fixed relation with respect to said fixed track member;
   a drive link assembly having a ramp contact member and being operatively mounted on said seatback member for translational engagement of said ramp contact member with said ramp means, such that as said seatback member is forwardly folded about said seatback pivot axis from said upright occupiable design position to said substantially horizontal load supporting position said track lock means moves to said released configuration, and said ramp contact member moves downwardly and rearwardly along said ramp means to thereby cause rearward longitudinal movement of said seat assembly relative to said fixed track member to a predetermined rear longitudinal position.

2. The fold flat vehicle seat of claim 1, wherein said drive link assembly includes a link arm member having an upper end and a lower end, and wherein said link arm member is mounted adjacent said upper end to said seatback member for pivotal movement with respect to said seatback member.

3. The fold flat vehicle seat of claim 2, wherein said link arm member is mounted adjacent said lower end to said seat cushion member for translational movement with respect to said seat cushion member.

4. The fold flat vehicle seat of claim 3, wherein said link arm member is mounted for travel with respect to said seat cushion member, between a raised rest position corresponding to said upright occupiable design position of said seatback member, and a lowered ramp-contact position corresponding to said substantially horizontal load supporting position of said vehicle seat.

5. The fold flat vehicle seat of claim 4, wherein said seatback member has a forwardly tilted easy entry position disposed angularly between said substantially upright occupiable design position and said substantially horizontal load supporting position, whereat said track lock means has moved to its released configuration to permit said longitudinal sliding movement of said movable track member and said seat assembly relative to said fixed track member, and wherein said link arm member is in an intermediate position between said raised rest position and said lowered ramp contact position.

6. The fold flat vehicle seat of claim 5, wherein said drive link assembly includes a rocker arm member having a captured end and a free end, and wherein said rocker arm member is connected between its captured end and its free end for pivotal movement to said link arm member adjacent said lower end of said link arm member, for travel with said link arm member between a start position and an end position corresponding to said lowermost position of said link arm member, and wherein said ramp contact member is mounted adjacent said captured end of said rocker arm member.

7. The fold flat vehicle seat of claim 6, wherein said ramp means comprises an upwardly and rearwardly facing ramp having an upper forward end and a lower rearward end.

8. The fold flat vehicle seat of claim 7, wherein, when said rocker arm member is in said start position, said ramp contact member is disposed in spaced relation above said upwardly and rearwardly facing ramp member, and wherein said rocker arm member has an initial contact position between said start position and said end position, wherein, in said initial contact position, said ramp contact member initially contacts said upwardly and rearwardly facing ramp member adjacent said upper forward end of said ramp member.

9. The fold flat vehicle seat of claim 8, wherein said rocker arm member is connected to said link arm, as aforesaid, by means of a mounting pin.

10. The fold flat vehicle seat of claim 9, wherein said link arm member includes a longitudinally oriented lost-motion slot disposed adjacent the lower end thereof and having an upper end defining a drive contact surface and a lower end defining a return contact surface, and wherein said mounting pin is slidably engaged within said lost-motion slot for travel between said drive contact surface and said return contact surface.

11. The fold flat vehicle seat of claim 10, wherein said drive contact surface of said lost-motion slot is disposed in spaced relation from said mounting pin when said link arm member is between said raised rest position and said intermediate position, is in contact with said mounting pin when said link arm member is in said intermediate position, and is pushing downwardly on said mounting pin when said link arm member is further moved from said intermediate position to said lowermost position.

12. The fold flat vehicle seat of claim 11, wherein said mounting pin is slidably engaged in a guide slot formed on said seat cushion member.

13. The fold flat vehicle seat of claim 12, wherein said track lock means includes a crank arm pivotally moveable between a locked position corresponding to said locked configuration of said track lock means and a released position corresponding to said released configuration of said track lock means.

14. The fold flat vehicle seat of claim 13, wherein said rocker arm is pivotally connected adjacent said captured end to said crank arm for movement of said captured end with said crank arm between said locked position of said crank arm and said released position of said crank arm.

15. The fold flat vehicle seat of claim 14, wherein, when said rocker arm member is in said initial contact position, as caused by downward pushing of said link arm member, continued downward pushing of said link arm member caused by forward pivotal folding movement of said seatback member, causes said crank arm to move from its locked position to its released position, thus permitting said movable track member to move longitudinally relative to said fixed track member.

16. The fold flat vehicle seat of claim 15, further comprising a first lever arm pivotally mounted on said movable track member for movement between a releasing position whereat said first lever arm causes said track lock means to move to said released configuration and a locking position whereat said first lever arm permits said track lock means to move to said locked configuration.

17. The fold flat vehicle seat of claim 16, wherein said first lever arm is operable by means of a sheathed cable member operatively connected between said first lever arm, and wherein forward folding movement of said seatback member a threshold distance from said substantially upright occupiable design position toward said substantially horizontal load supporting position causes said first lever arm to move correspondingly from said locking position to said releasing position.

18. The fold flat vehicle seat of claim 17, further comprising a second lever arm pivotally mounted on said movable track member for movement between a hold-open position whereat said second lever arm retains said first lever arm in said locking position and a start position whereat said second lever arm permits said first lever arm to move to said releasing position.

19. The fold flat vehicle seat of claim 6, wherein said ramp contact member comprises a roller mounted for rotation on said rocker arm member adjacent said free end.

20. The fold flat vehicle seat of claim 19, wherein when said rocker arm member is in said end position, said roller is disposed off the end of said upwardly and rearwardly facing ramp member.

21. The fold flat vehicle seat of claim 1, further comprising a biasing means for biasing said seatback member toward said substantially horizontal load supporting position.

22. The fold flat vehicle seat of claim 1, wherein said seatback member latch means is a rotary recliner mechanism.

* * * * *